(12) United States Patent
Kiesel et al.

(10) Patent No.: US 8,963,092 B2
(45) Date of Patent: Feb. 24, 2015

(54) TRAFFIC MONITORING BASED ON NON-IMAGING DETECTION

(75) Inventors: Peter Kiesel, Palo Alto, CA (US); Marshall W. Bern, San Carlos, CA (US); Joerg Martini, San Francisco, CA (US); Malte Huck, Munich (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 578 days.

(21) Appl. No.: 13/328,800

(22) Filed: Dec. 16, 2011

(65) Prior Publication Data

US 2013/0153771 A1 Jun. 20, 2013

(51) Int. Cl.
*G01J 1/04* (2006.01)
(52) U.S. Cl.
CPC .......................................... *G01J 1/04* (2013.01)
USPC .......................................... 250/353; 250/372
(58) Field of Classification Search
CPC .............................. G01J 1/04; H01L 31/0232
USPC ....................... 250/353, 372, 214.1
See application file for complete search history.

(56) References Cited

U.S. PATENT DOCUMENTS

| 4,258,351 | A | 3/1981 | Shigeta et al. |
| 6,275,171 | B1 | 8/2001 | Waldman et al. |
| 6,404,506 | B1 * | 6/2002 | Cheng et al. ................. 356/634 |
| 7,027,634 | B2 | 4/2006 | Odell |
| 7,351,975 | B2 | 4/2008 | Brady et al. |
| 7,701,580 | B2 | 4/2010 | Bassler et al. |
| 2007/0272841 | A1 | 11/2007 | Wiklof |
| 2011/0222062 | A1 | 9/2011 | Martini et al. |

FOREIGN PATENT DOCUMENTS

| FR | 2934704 | 2/2010 |
| WO | WO9207281 | 4/1992 |

OTHER PUBLICATIONS

Office Action dated Apr. 12, 2013 from EP Application No. 12197291.3, 9 pages.

\* cited by examiner

*Primary Examiner* — David Porta
*Assistant Examiner* — Faye Boosalis
(74) *Attorney, Agent, or Firm* — Hollingsworth Davis, LLC

(57) ABSTRACT

Traffic monitors based on non-imaging radiation detectors are described. A traffic monitor includes a non-imaging radiation detector that senses spatially patterned radiation emanating from objects moving in a traffic pattern. The detector generates a time varying output signal based on the sensed radiation. Signal processing circuitry is used to analyze the time varying output signal using time domain analysis to provide the traffic information.

24 Claims, 20 Drawing Sheets

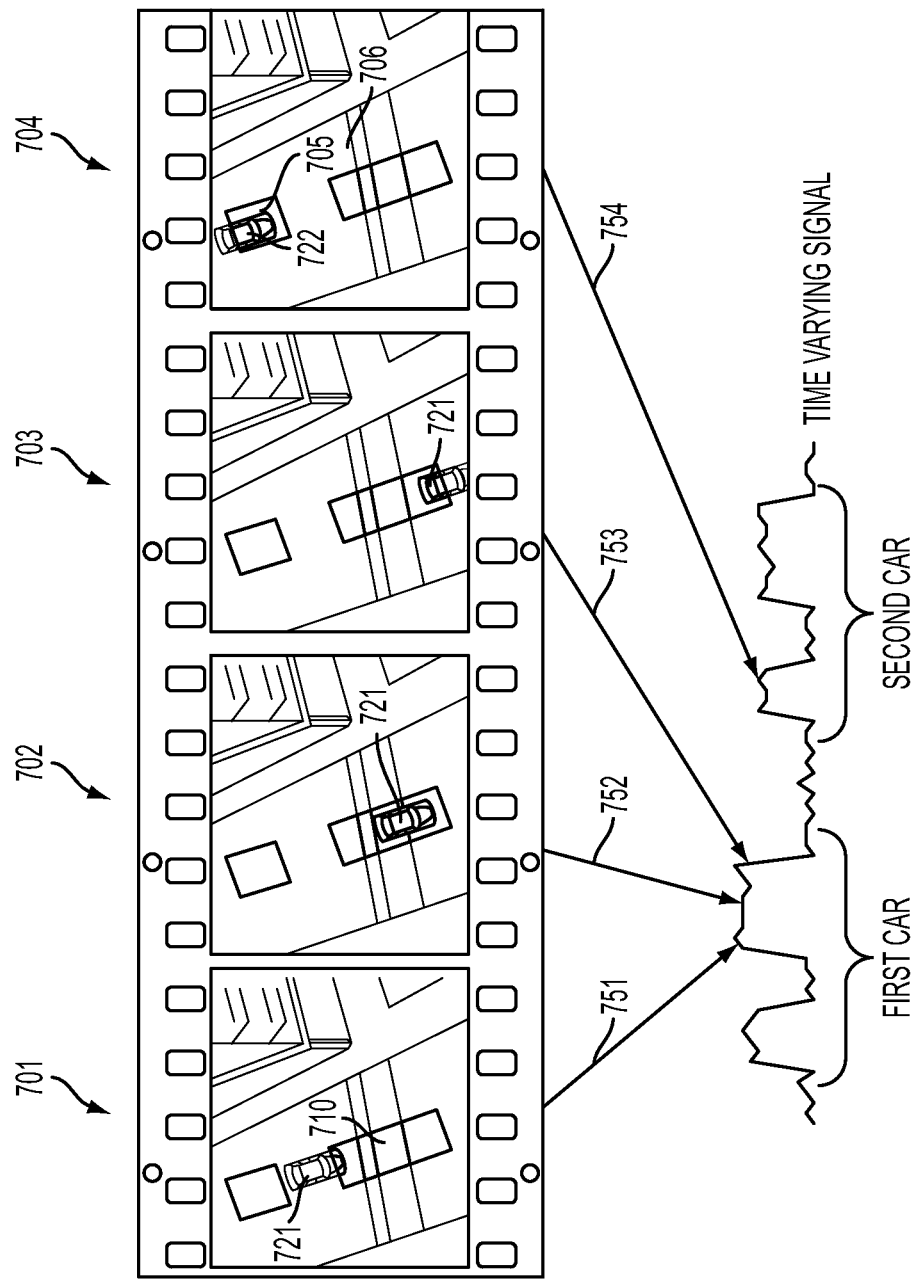

TRAFFIC MONITORING BASED ON NON-IMAGING DETECTION

FIELD

The present disclosure relates generally to monitoring traffic patterns.

BACKGROUND

The average rush-hour commuter spends the equivalent of one full year stuck in traffic. That weighs in at a national cost of $78 billion, including both wasted time and fuel. According to the U.S. Department of Transportation statistics, every year 42,000 traffic-related fatalities and 2.7 million injuries cost the economy additional $230 billion. Furthermore, the price paid by the victims of those accidents extends well beyond any measurable number. Improving surface transportation safety, reducing wasted time and fuel costs, and protecting the environment would be beneficial.

SUMMARY

Embodiments described in this disclosure relate to traffic monitors. In some embodiments, a traffic monitor includes a non-imaging radiation detector that senses spatially patterned radiation emanating from objects moving in a traffic pattern and generates a time varying output signal based on the sensed radiation. Signal processing circuitry analyzes the time varying output signal using time domain analysis to provide traffic information.

According to various aspects, the traffic monitor can include a radiation source configured to produce the spatially patterned radiation and/or a mask configured to interact with radiation emanating from the moving objects to produce the spatially patterned radiation.

Some embodiments are directed to a traffic monitor that includes a non-imaging radiation detector and a mask. The mask comprises a non-periodic arrangement of mask features. The traffic monitor includes a focusing element configured to focus radiation emanating from objects moving in a traffic pattern and affected by the mask onto the non-imaging radiation detector. The non-imaging radiation detector is configured to sense the radiation and to generate a time varying output signal based on sensed radiation.

Some embodiments involve a traffic monitor that includes a non-imaging radiation detector and a mask comprising arrangement of mask features. A focusing element is configured to focus radiation emanating from objects moving in a traffic pattern and affected by the mask onto the non-imaging radiation detector. The non-imaging radiation detector senses the radiation and generates a time varying output signal based on the sensed radiation. The traffic monitor includes signal processing circuitry configured to analyze the time varying output signal by time domain analysis to provide traffic information.

According to some implementations, a traffic monitor includes a non-imaging radiation detector and a mask comprising a multi-dimensional array of mask features. A focusing element focuses radiation emanating from objects moving in a traffic pattern and affected by the mask onto the non-imaging radiation detector. The non-imaging radiation detector is configured to sense the radiation and to generate a time varying output signal based on sensed radiation.

Some embodiments involve a method of monitoring traffic. According to a method of monitoring traffic, spatially patterned radiation emanating from traffic objects moving in a traffic pattern is sensed. A time varying output signal based on the spatially patterned radiation is generated. The time-varying output signal is analyzed using time domain analysis. Traffic information is provided based on the time domain analysis of the time-varying output signal.

According to some embodiments, a traffic monitor includes a radiation source configured to emit spatially patterned radiation toward moving traffic objects which is reflected by the moving traffic objects. A non-imaging radiation detector is configured to sense the spatially patterned radiation which is reflected by the moving traffic objects and to generate a time varying output signal based on the reflected radiation. Signal processing circuitry analyzes the time varying output signal to provide traffic information.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 6 and 7 are diagrams that illustrate processes for monitoring traffic objects in accordance with various embodiments;

DESCRIPTION OF VARIOUS EMBODIMENTS

Figure 1:
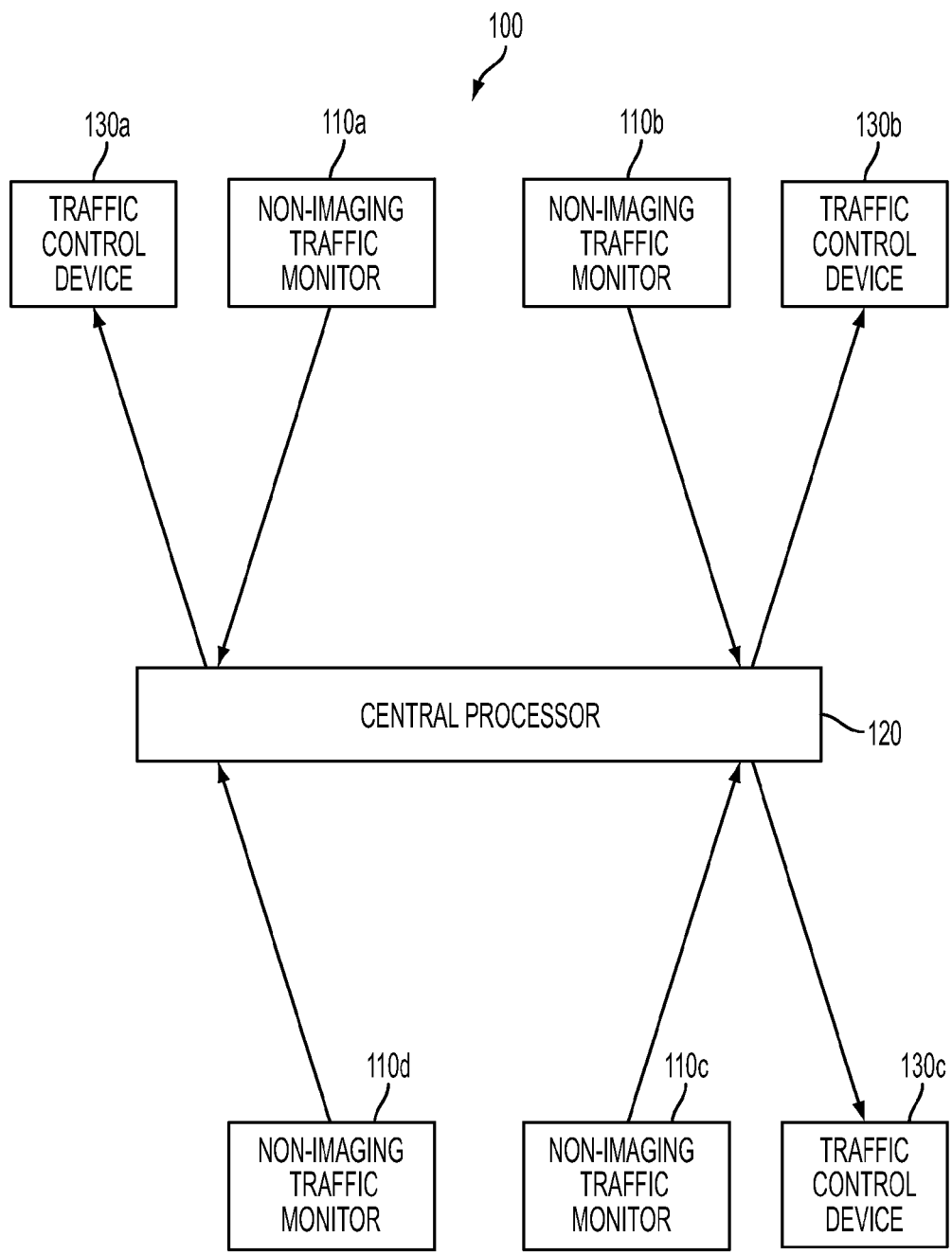
FIG. 1 is a block diagram of a central traffic monitoring and/or control system 100 that may employ one or more non-imaging traffic monitors according to embodiments discussed herein.

Despite rising fuel costs, people continue to rely on motor vehicles as their primary mode of transportation. More cars are competing for capacity on roadways that simply are not keeping pace with growth. The resulting traffic congestion presents problems with ramifications that extend far beyond drivers' inconvenience. Traffic congestion slows the transportation of raw materials to manufacturers and finished goods to market, adversely impacting the economy. Employees who arrive late to their offices reduce productivity, costing the U.S. economy alone $4.2 billion in "lost hours." Stop-and-go traffic wastes fuel, pollutes the air and frustrates drivers. In the 10 most congested areas, each rush-hour traveler spends the equivalent of almost eight workdays stuck in traffic. Yet, even cities with strong public transportation systems fail to persuade a significant percentage of drivers to get off the road.

Adding traffic capacity is not always feasible. At estimated costs of up to $10 million per mile for a state-of-the-art interstate lane, expansion rarely fits within a municipal budget. Even if funds are available, there may be limited physical space to support the growth.

Two types of congestion can be identified and designated as recurring congestion and non-recurring congestion. Recurring congestion is the result of having more vehicles than space. Nonrecurring congestion is caused by a specific event, such as a weather event, an accident, a construction work zone or other obstacles. Most urban areas calculate their non-recurring congestion at 50 percent, with the remaining 50 percent of the problems caused simply by the sheer number of cars and other vehicles on the road.

Traffic flow management involving traffic monitoring and traffic control can contribute to traffic flow efficiency for both recurring and non-recurring congestion. Appropriate traffic flow management of recurring and/or non-recurring congestion can also serve to reduce accidents, including vehicle-vehicle collisions and vehicle—pedestrian collisions. Furthermore, traffic flow management can substantially decrease traffic congestion, for example, by directing traffic around construction zones, accidents or other road obstacles. Effective traffic flow management relies on monitoring traffic information such as traffic density, speed and/or acceleration of moving traffic objects, and/or composition of traffic objects, e.g., cars, trucks, motorcycles, bicycles, pedestrians, etc., among other characteristics. Based on the traffic information, traffic control may be implemented, e.g., by controlling traffic lights, re-routing traffic, and/or by opening or closing certain traffic lanes.

The traffic information may be obtained from multiple roadway locations, e.g., one or more roadway sections and or intersections of a traffic managed area. Some traffic monitoring approaches have involved a network of video cameras. However, cameras are relatively expensive and they do not directly provide the required information (e.g., vehicle type, density, speed, etc.). Extensive image evaluation is required to extract the relevant information from a picture sequence. In addition, picture images or videos raise concerns regarding privacy protection since other private information could be extracted from the pictures. A technical challenge for cameras, e.g., silicon-based charge coupled device (CCD) cameras, are varying ambient conditions e.g. the dark of night, strong sunlight, rain, fog, etc. CCD cameras generally rely on image acquisition in the visible or near infrared (NIR) spectral ranges. In some situations, as discussed in more detail below, images acquired in these spectral ranges may be suboptimal, leading to problems in extracting relevant traffic information.

Embodiments described herein involve approaches for traffic monitoring and/or control which rely on non-imaging traffic monitors rather than imaging detectors, such as cameras. As discussed herein, a non-imaging traffic monitor can use a non-imaging radiation detector in combination with a spatial mask to detect information about objects moving in a traffic pattern. For example, the traffic information may include the type, size, color, speed, acceleration, direction, number, and/or density of objects, the distance between traffic objects, and/or other traffic information.

FIG. 1 is a block diagram of a central traffic monitoring and/or control system 100 that may employ one or more non-imaging traffic monitors 110a-110d according to embodiments discussed herein. In this example, each the traffic monitors 110a-110d are positioned to monitor a particular roadway section or intersection and are coupled to a central processor 120 located at a remote location through wired or wireless communication channels. The traffic monitors 110a-d may be located in various locations, such as on a light pole, a traffic light, or other structure, for example, in a range of about 6-100 meters from the roadway section or intersection they are monitoring.

The central traffic monitoring and/or control system 100 can be configured so that traffic patterns at strategic roadway sections and/or intersections are monitored by the traffic monitors 110a-d. Each traffic monitor 110a-d is configured to monitor traffic patterns of and develop traffic information relevant to its associated roadway section or intersection. For example, monitoring the traffic patterns and determining traffic information comprises determining various characteristics of the moving objects on the roadway section or intersection of interest. The traffic information acquired by each traffic monitor can be transferred to a central processor 120. One or more of the roadway sections and/or intersections monitored by the traffic monitors 110a-110d may be controlled by a traffic control device 130a-130c. The traffic control devices 130a-130c may comprise traffic stop/go lights, traffic lane controls, traffic signs, and/or other devices used to control the flow of traffic.

In a semiautomatic mode, the central processor 120 may, automatically or on command, collect traffic information from each of the traffic monitors 110a-110d. The central processor 120 may process the traffic information collected from some or all of the traffic monitors 110a-110d and may format the collected traffic information and/or provide the collected traffic information to a human operator. For example, the information provided to the operator can include a complete set of information from all traffic monitors, summary information from one or more of the traffic monitors, and/or statistical traffic information. In various implementations, the complete, summary and/or statistical traffic information may be displayed, printed, and/or otherwise provided to the human operator. The operator may use the traffic information provided by the central processor 120 to make decisions about controlling traffic via the traffic control devices 130a-130c. In an automatic mode, the central processor 120 may automatically use the collected traffic information to make decisions about traffic control and may automatically send signals to the traffic control devices 130a-130c that control their operation.

Figure 2:
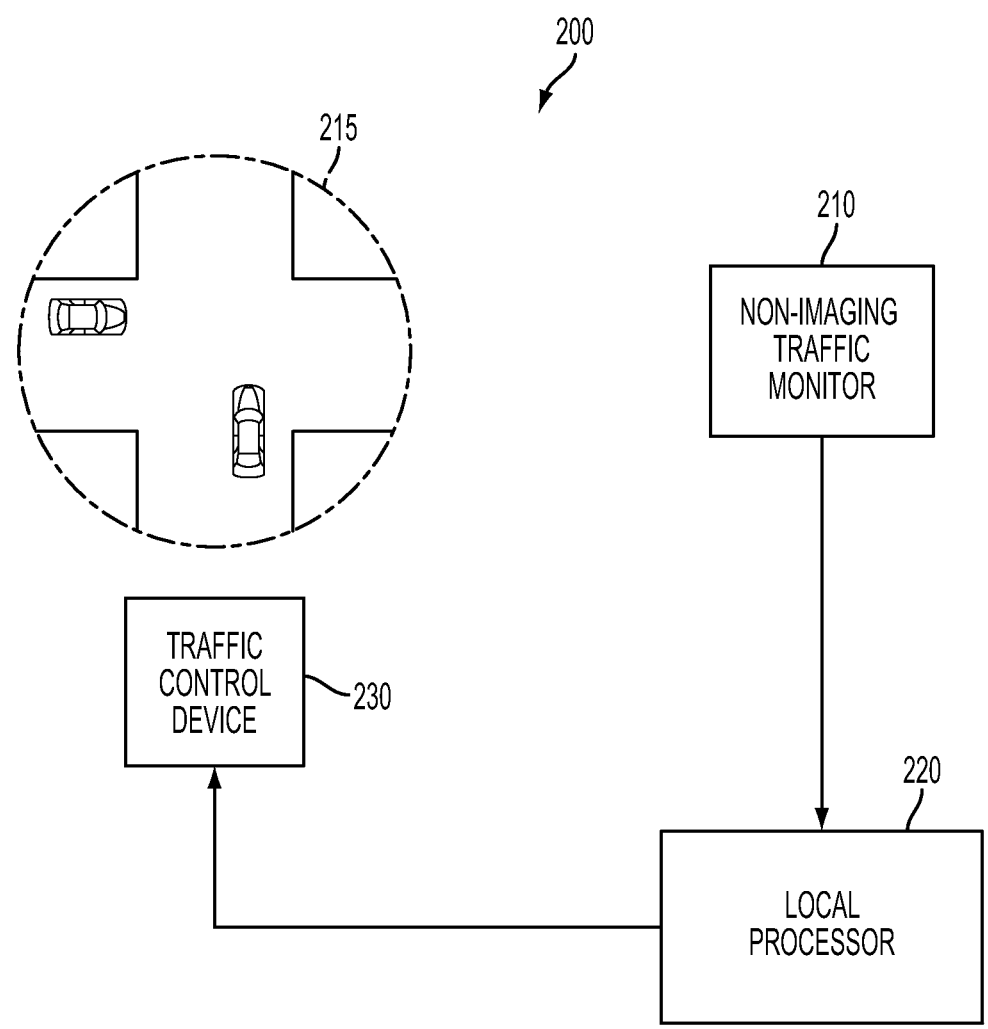
FIG. 2 is a block diagram that shows a local traffic monitoring and control system employing a non-imaging traffic monitor according to various embodiments.

FIG. 2 is a block diagram that shows a local traffic monitoring and control system 200. The local system 200 includes a non-imaging traffic monitor 210 positioned to monitor a roadway section or intersection 215, a local processor 220, and a traffic control device 230. In this configuration, the local traffic monitoring and control system 200 provides for local control of the roadway section or intersection, without necessarily sending and/or receiving information to a remote central processor.

The non-imaging traffic monitor 210 is configured to monitor traffic patterns and develop traffic information relevant to its associated roadway section or intersection 215. For example, the observation window size for the roadway section or intersection 215 may be in a range from about 30 meters to about 100 meters. Traffic objects can include pedestrians, bicycles, cars, trucks, etc. The size of a typical traffic object, e.g., a car, is about 3 meters. The non-imaging traffic monitor 210 provides traffic information about the traffic objects in the roadway section or intersection 215 to the local processor 220. Based on the traffic information, the local processor 220 may make decisions to control the traffic flow and to send control signals to one or more traffic control devices 230 to control the traffic flow in the intersection 215. For example, depending on the traffic flow at an intersection the duty cycle of the traffic light can be regulated to increase through put.

Figure 3:
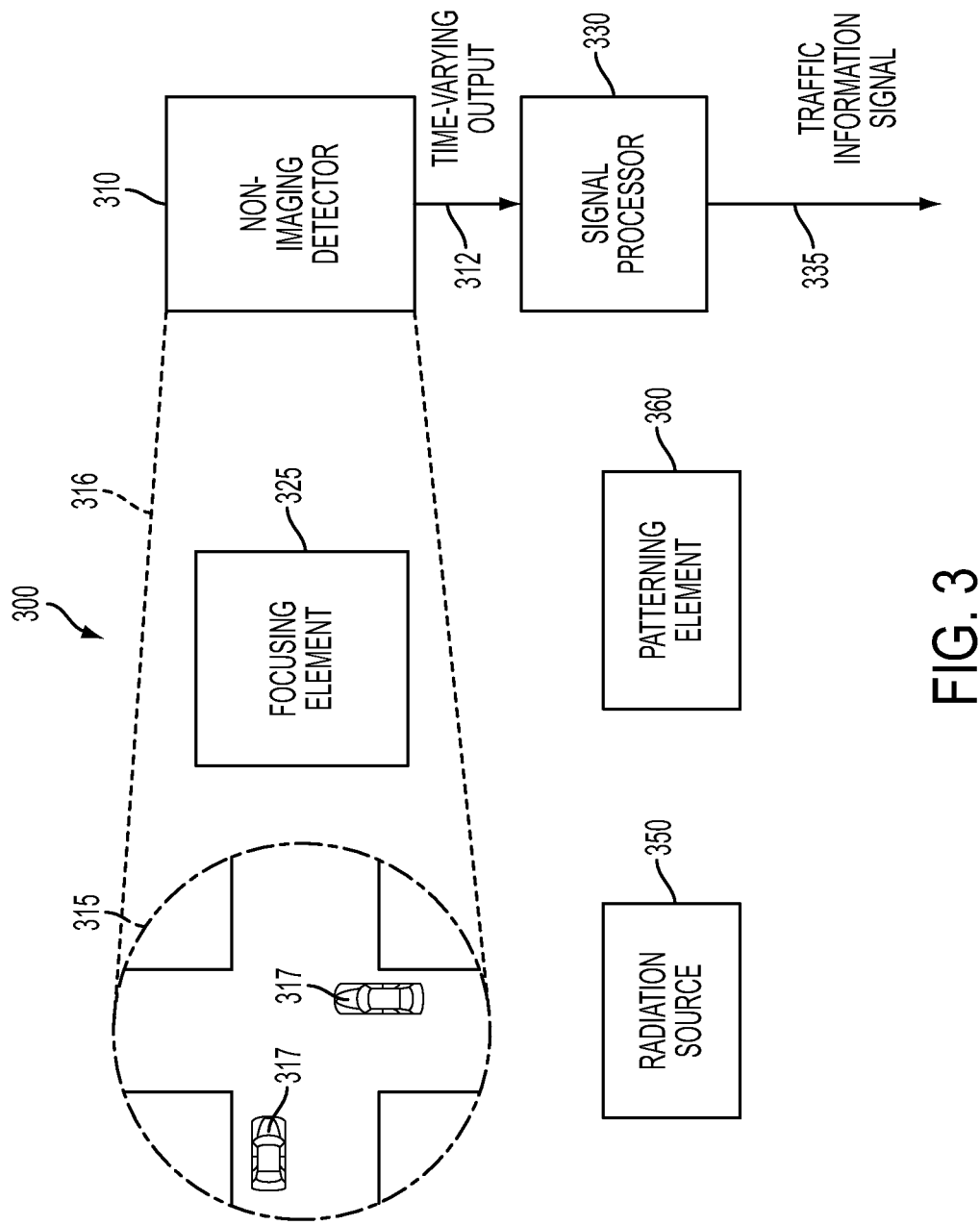
FIG. 3 illustrates a non-imaging traffic monitor according to some embodiments.

FIG. 3 illustrates a non-imaging traffic monitor 300 according to some embodiments. The non-imaging traffic monitor 300 includes a non-imaging radiation detector 310 that includes at least one single pixel sensor, such as a photodiode, configured to sense radiation emanating from moving traffic objects 317 in a traffic pattern on a roadway section or intersection 315. The radiation emanating from the moving objects may comprise scattered, reflected, refracted, actively emitted, or other types of radiation.

In some configurations, a focusing element 325 is used which focuses and/or directs the radiation emanating from the moving traffic objects 317 onto the non-imaging radiation detector 310. For example, the focusing element may comprise one or more lenses disposed between the moving objects 317 and the non-imaging radiation detector 310. In some cases, the non-imaging radiation detector 310 may be a large area single pixel detector, e.g., having an area in a range of about 1 mm$^2$ to about 1 cm$^2$.

The traffic monitor may rely on ambient radiation, e.g., sunlight and/or streetlights illuminating the roadway section or intersection 315. In some cases, the traffic monitor includes a radiation source that directs radiation toward the roadway section or intersection 315. The radiation source may generate radiation that is outside the visible spectrum, such as infrared radiation or radiation in the terahertz frequency range, for example. Radiation from the ambient and/or other radiation source interacts with the traffic objects moving through the roadway section or intersection 315 causing at least some of the radiation to emanate (e.g. be reflected) from the moving objects toward the non-imaging radiation detector.

The non-imaging traffic monitor includes a patterning element 360. In some cases, the patterning element 360 interacts with the radiation after the radiation is reflected (or otherwise emanates) from the moving objects 317. In these cases, the patterning element 360 may be disposed in the path of the radiation emanating from the moving objects, between the moving objects 317 and the non-imaging radiation detector 310. In some cases, the patterning element 360 interacts with the radiation directed towards the moving objects 317. In these cases, the patterning element is disposed in the path of the radiation directed towards the moving objects (before the radiation is reflected from the moving objects 317). For example, the patterning element 360 may be disposed between the radiation source, e.g., the ambient radiation source and/or other radiation source, and the moving objects 317. As described below with reference to FIG. 13, the spatial patterning of the radiation may involve patterning the roadway itself.

The patterning element may include patterning features which are arranged in various ways, such as in periodic, pseudo-random, one dimensional and/or multi-dimensional arrangements. Regardless of whether the patterning occurs before or after the radiation interacts with the moving objects, the radiation emanating from the moving objects 317 varies with time. The time varying radiation is sensed by non-imaging radiation detector 310. In response to the sensed radiation, the non-imaging radiation detector 310 generates a time varying electrical output signal 312 that contains information about the traffic objects 317 in the traffic pattern of the roadway section or intersection 315.

The time varying output signal 312 can be analyzed by a signal processor 330, such as by employing time domain and/or frequency domain analysis techniques. Based on the analysis, the signal processor 330 generates a signal 335 that includes traffic information. For example, the traffic information signal 335 may include traffic information such as the density, speed, type, direction, and/or other information about the moving objects 317 in the intersection 315.

Figure 4:
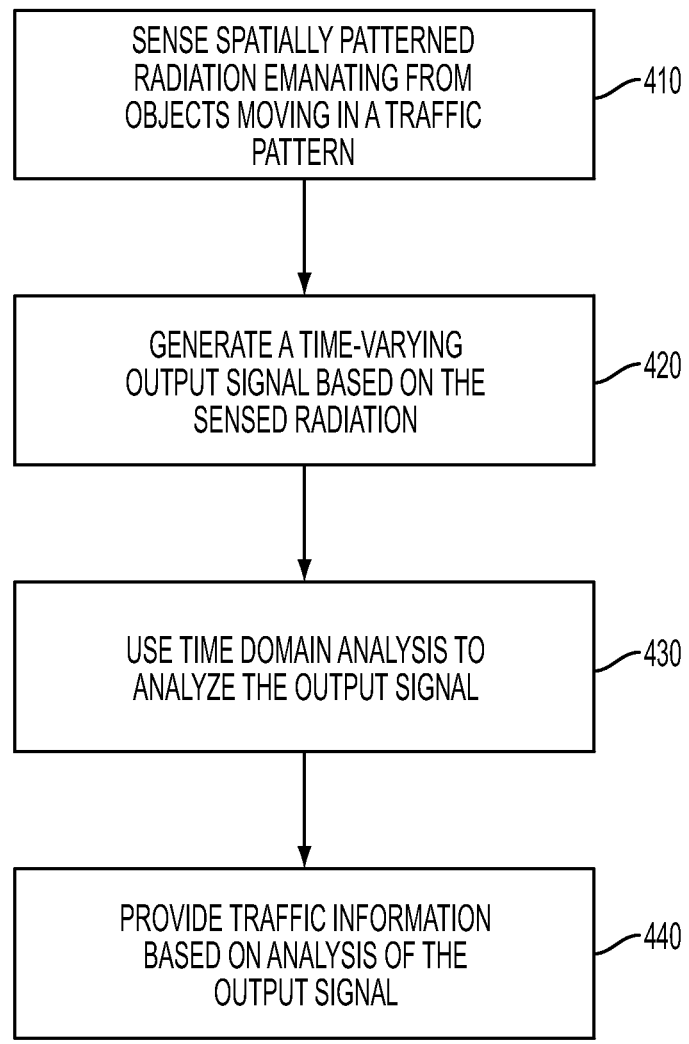
FIG. 4 is a flow diagram of a process for providing traffic information.

FIG. 4 is a flow diagram that illustrates a process of providing traffic information. Spatially patterned radiation that emanates from objects moving in a traffic pattern is sensed 410 by a non-imaging radiation detector. In some cases, the spatially patterned radiation may derive from non-spatially patterned radiation emanating from the traffic objects which is spatially patterned, e.g., by a mask, after emanating from the traffic objects but before impinging on the detector. In other cases, the spatially patterned radiation may be radiation that is spatially patterned before being reflected by the traffic objects. In either of these cases, spatially patterned radiation impinges on the detector. The non-imaging radiation detector generates 420 a time-varying output signal based on the sensed radiation. The output signal is analyzed 430 using time or frequency domain analysis to provide 440 information about the traffic pattern.

Figure 5:
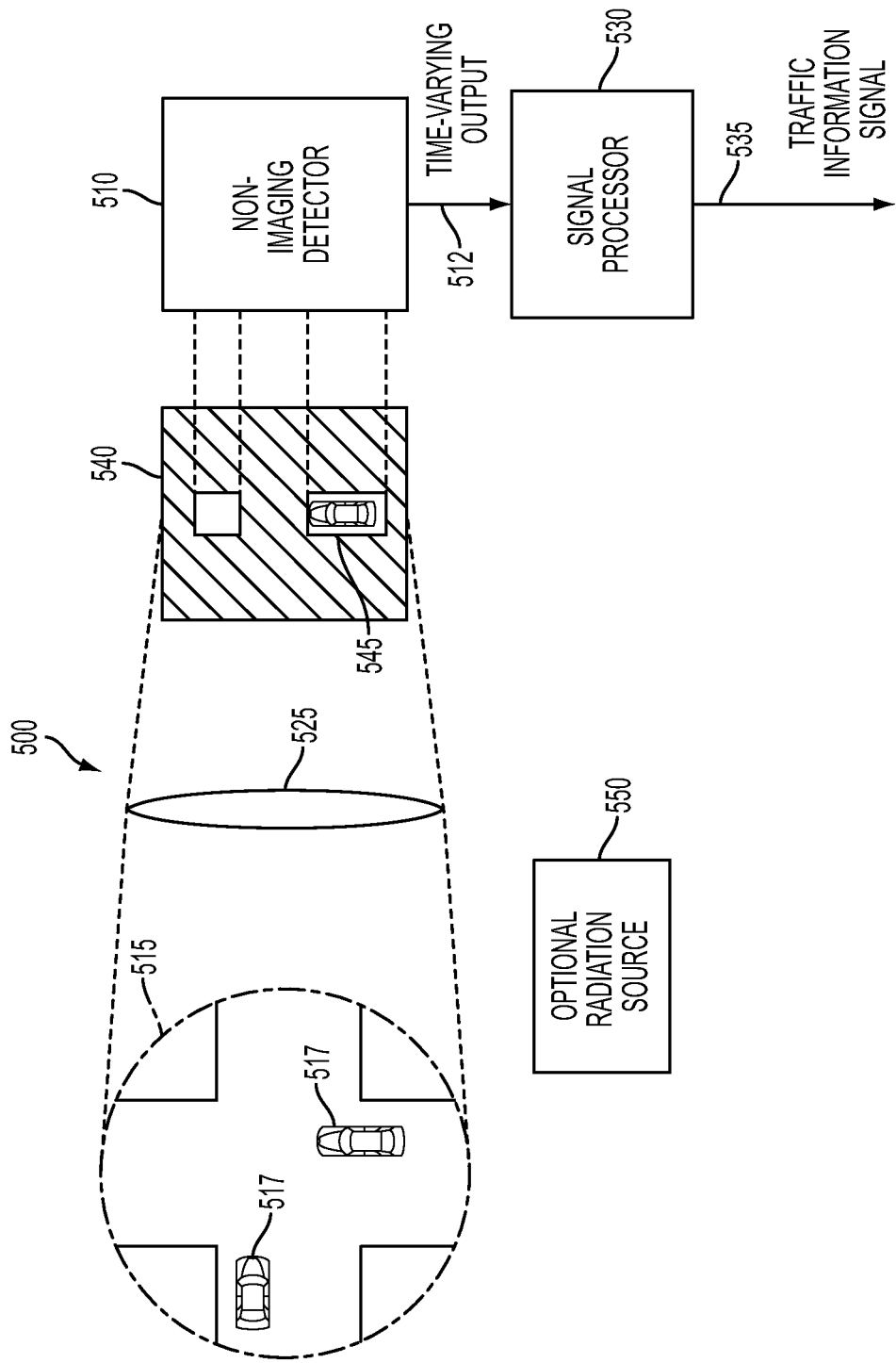
FIG. 5 illustrates a non-imaging traffic monitor that incorporates a mask according to some embodiments.

FIG. 5 illustrates a non-imaging traffic monitor 500 according to some embodiments. The non-imaging traffic monitor 500 includes a non-imaging radiation detector 510 that includes at least one single pixel sensor, such as a photodiode, configured to sense radiation emanating from moving traffic objects 517 in a traffic pattern on a roadway section or intersection 515. Radiation emanating from the moving objects may comprise scattered, reflected, refracted, actively emitted, or other types of radiation. In some cases, the non-imaging radiation detector 510 may be a large area single pixel detector, e.g., having an area in a range of about 1 mm$^2$ to about 1 cm$^2$. Focusing optics 525 focuses the radiation emanating from the moving traffic objects 517 onto the non-imaging radiation detector 510. A mask 540 includes features 545 that affect the radiation emanating from the moving objects 517.

In some embodiments, the non-imaging radiation detector 510 is sensitive to a particular radiation frequency band. The mask features 545 are transparent to that frequency band, whereas other regions of the mask 545 are opaque to that frequency band. For masks having radiation transparent features, the focusing optics may focus the radiation emanating from the moving objects onto the non-imaging radiation detector through the features of the mask, as illustrated in FIG. 5.

The mask features 545 may be arranged in various ways, such as in periodic, pseudo-random, one dimensional and/or multi-dimensional arrangements. The radiation emanating from the moving objects and affected by the mask, is sensed by non-imaging radiation detector 510. The use of the mask in conjunction with a single pixel detector is comparable to a physical binning of many camera pixels, which is an alternate embodiment for the single pixel detector. In response to the sensed radiation, the non-imaging radiation detector 510 generates a time varying electrical output signal 512 that contains information about the traffic objects 517 in the traffic pattern of the roadway section or intersection 515.

The time varying output signal 512 can be analyzed by a signal processor 530, such as by employing time domain and/or frequency domain analysis techniques. Based on the analysis, the signal processor 530 generates a signal 535 that includes traffic information. For example, the traffic information signal may include information such as the density, speed, type, direction, and/or other information about the moving objects 517 in the intersection 515.

In some case, special optics (such as fish eye optics) can be used to increase size of the observation window for the roadway section or intersection 515. Thus, even though the non-imaging radiation detector is placed on a light post about 8 meters above street level, a large observation window can be viewed. Errors and/or distortions in the optics (e.g., filters lenses, etc.) in the radiation path can be compensated for in the mask design. A flat imaging pane is not required as "curved or bended" masks can be used in the imaging plane with a flat radiation detector behind the masks.

Figure 6:
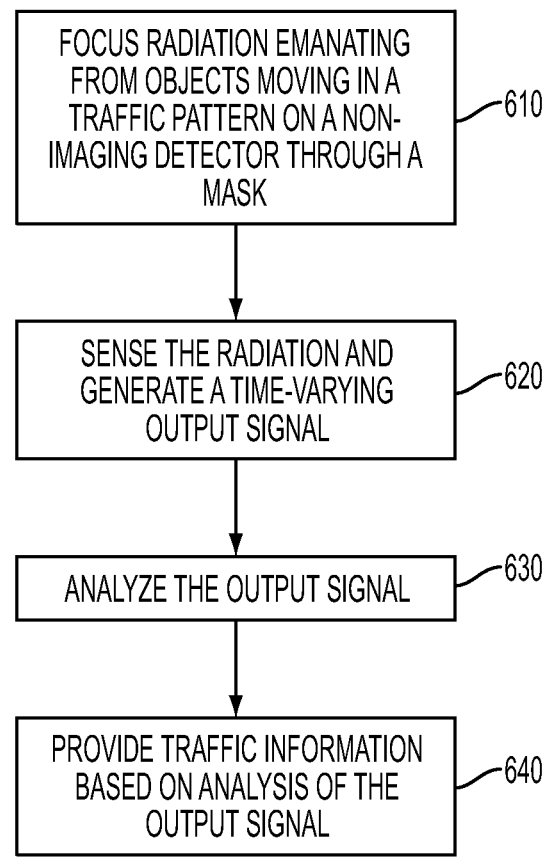

The diagrams of FIGS. 6 and 7 illustrate processes for monitoring traffic objects in accordance with various embodiments. Radiation emanating from objects moving in a traffic pattern and modulated by a mask is focused 610 onto a non-imaging radiation detector. The detector senses 620 the radiation and generates a time-varying signal based on the amount of radiation incident on the detector. The time-varying output signal can be analyzed 630 to extract 640 traffic information.

FIG. 7 shows four images 701-704 taken at time snapshots $t_1<t_2<t_3<t_4$ of a traffic pattern corresponding to one lane of traffic moving through an intersection. A mask having two radiation transparent apertures 705, 710 and an optically opaque region 706 is superimposed on each image 701-704. Radiation emanating from the moving objects is substantially blocked from the detector in the opaque regions 706 of the mask. Light emanating from the moving objects passes through the mask apertures to the detector. FIG. 7 shows correspondence between the four images 701-704 and the time varying signal produced by the detector at times $t_1$ through $t_4$.

At time $t_1$ a first car 721 enters the region of the second aperture, 710 which causes an upward deflection in the amplitude of the time-varying signal output by the detector, as indicated by arrow 751. At time $t_2$ the first car 721 remains within the region of the second aperture 710, maintaining the increased amplitude of the time-varying signal as indicated by arrow 752. At time $t_3$, the first car 721 begins to exit the region of the second aperture 710 causing the time-varying signal to begin to decrease towards its nominal level (arrow 753). At time $t_4$, the second car 722 enters the region of the first aperture 705, which causes an upward deflection in the amplitude of the time-varying signal, as indicated by arrow 754.

In some embodiments, the signal processor is configured to compare the time-varying signal to a number of expected output signals, each expected output signal associated with a particular traffic pattern. If a match is found between the expected output signals and the actual output from the detector, the traffic pattern in the intersection can be identified. The traffic pattern may characterized by traffic information such as traffic density, speed and/or acceleration of moving traffic objects, types of traffic objects, e.g., cars, trucks, motorcycles, bicycles, pedestrians, etc., and/or other traffic related information.

Figure 8:
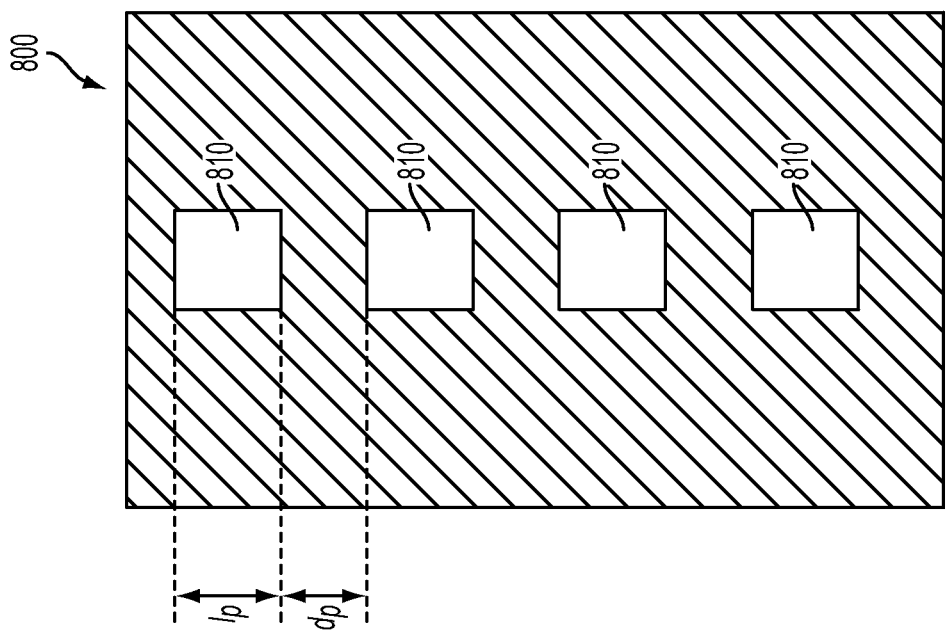

FIGS. 8 through 12 depict various mask configurations that may be used in the non-imaging traffic monitor. Mask 800 illustrates a periodic mask comprising four mask features 810 which have the same length, $l_2$. The distance, $d_p$, between the features 810 is the same. Masks that comprise periodically arranged features, as illustrated in FIG. 8, may be particularly useful when used in conjunction with frequency domain analysis. Note that although the mask of FIG. 8 shows four features, any number of features may be used for the mask.

The features are regions of the mask that interact with the radiation emanating from the moving objects differently from other regions of the mask. The features may be regions on the mask that are relatively more transparent to the radiation frequency of interest when compared to other regions of the mask that are relatively opaque to the radiation frequency of interest. In some configurations, the features are physical openings in an otherwise radiation opaque mask. In some cases, the features may include radiation filters. For example, the features may filter out certain frequencies while allowing other frequencies to pass through the features. The radiation filters may be used for various purposes. For example, the filters may be used to filter out unwanted or spurious radiation frequencies so that the signal to noise ratio in the frequency band of interest is enhanced. As another example, mask features that filter certain frequencies in the visible frequency spectrum may be used to determine the color of the moving objects.

Figure 9:
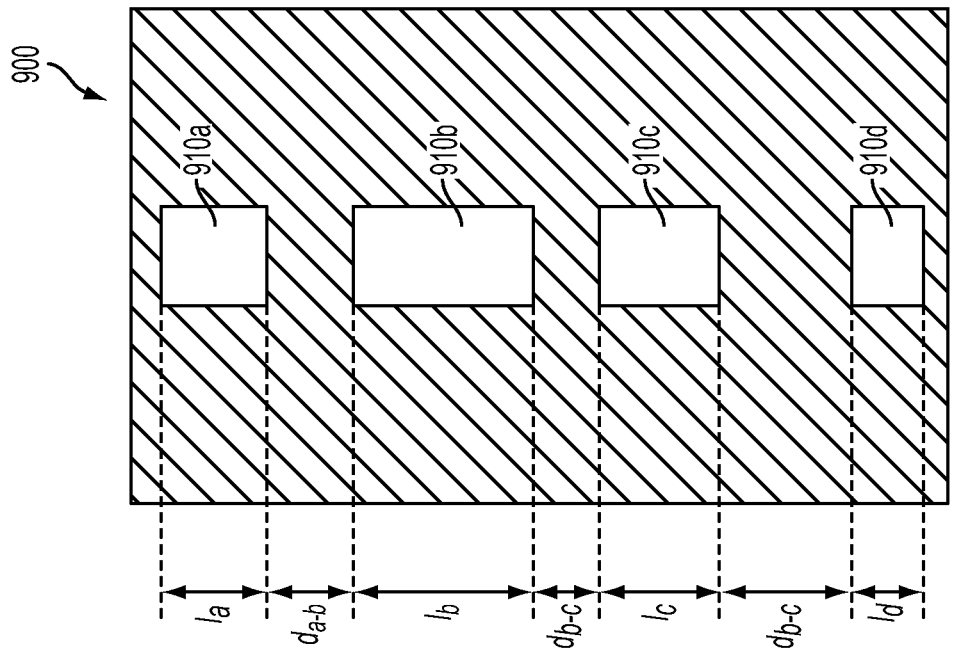
FIGS. 8 through 13 depict various mask configurations that may be used in the non-imaging traffic monitor.

A non-periodic mask is 900 is illustrated in FIG. 9. The non-periodic mask includes four features 910a-910d, each of which has a different length, $l_a$-$l_d$. The distances $d_{a-b}$, $d_{b-c}$, $d_{c-d}$, between the features 910a-910d are different. In some implementations, non-periodic masks provide more effective time domain analysis, which may involve comparing the time-varying output signal of the detector to one or more expected outputs.

A non-periodic or pseudorandom mask allows extraction of traffic information simultaneously from multiple traffic objects in the traffic pattern detection area. For example, in some implementations, a coding-encoding technique is used. The pattern of the mask features modulates the radiation from the moving object, e.g., vehicle, thereby creating a characteristic time variation in the output signal of the radiation sensor. Correlating the output signal with the known mask pattern may allow extraction of information about the objects with discrimination from background noise. This technique provides a relatively high signal to noise ratio without requiring highly precise optical components and sensitive detectors, thus yielding a compact, robust, low cost, and high performance traffic monitor. According to various embodiments discussed herein, the monitored traffic objects are moving objects, thus slow intensity changes, for example, changes due to sunlight or weather conditions, will be registered as "unmodulated" background changes, which will be ignored during data processing.

Embodiments discussed herein include the use of a non-pixelated detector. Despite the relatively large area of the detector, e.g., in a range of about 1 mm$^2$ to about 1 cm$^2$, the mask patterning enables a relatively high spatial resolution of the moving objects. In some implementations discussed herein, the spatial resolution is not determined by the detector size, but by the minimum feature size of the mask pattern. This allows for independently detecting and characterizing objects with a separation (in the traffic direction) that can approach the dimension of the individual traffic objects. Furthermore, traffic monitors discussed herein are tolerant to background radiation emanating from static objects in the area of interest since they may contribute to the background signal but do not create a characteristic time modulated signal.

Figure 11:
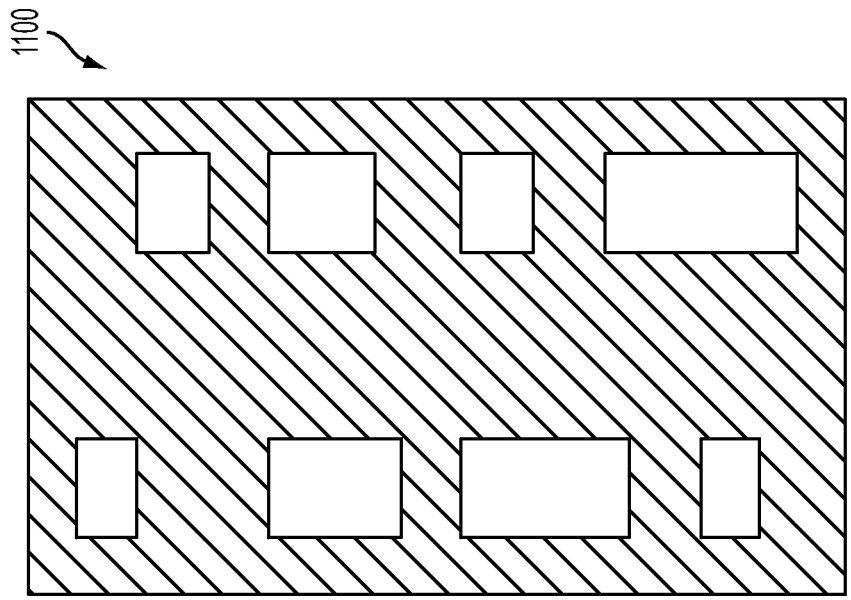
Figure 10:
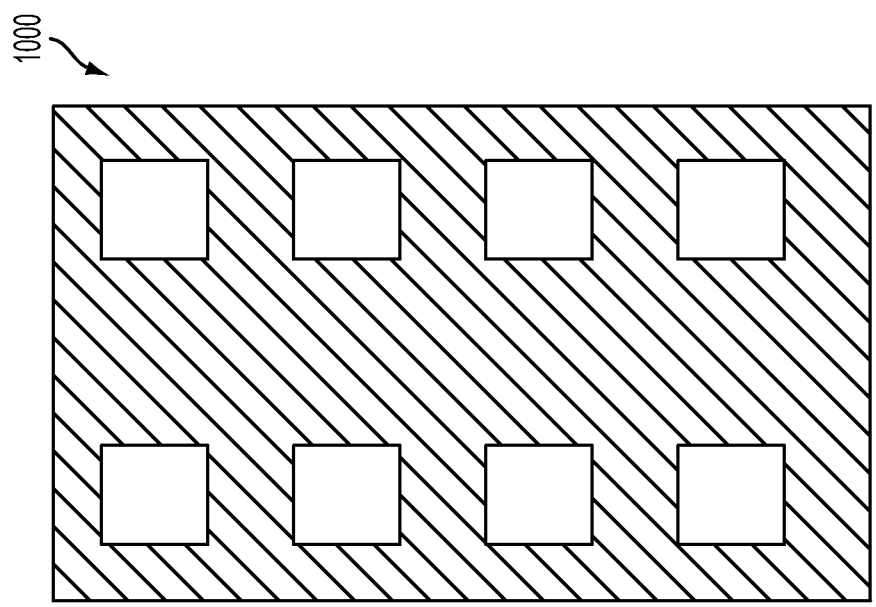
Figure 12:
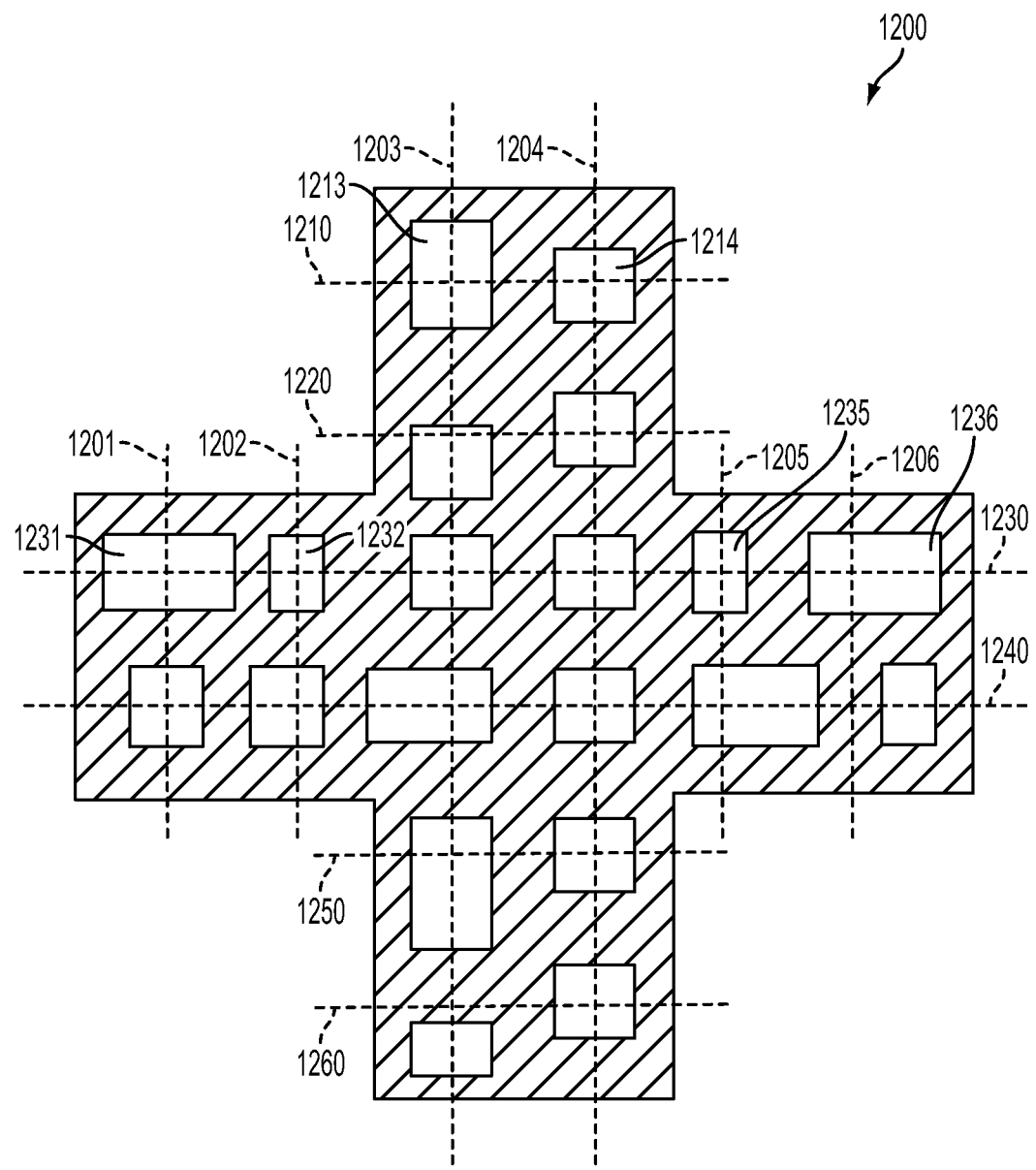

Masks 800 and 900 are examples of one-dimensional masks. One dimensional masks include a set of optical features arranged along a column or row which, for example, can be associated with a single traffic lane. Masks may also be multi-dimensional, as shown in FIGS. 10 through 12. FIGS.

10 and 11 show two dimensional masks 1000, 1100 having two columns of optical features. Notably, the terms "row" and "column" for a mask can be arbitrarily designated. For example, mask 800 may be considered to have two columns of four apertures, or four rows of two features. Each column (or row) of a mask may be associated with a particular lane of traffic. For the purpose of the discussion below, mask 1000 is designated as having two columns of four features.

In addition to being two-dimensional mask, mask 1000 is also periodic, having columns of periodically arranged features. Periodic masks are those in which the mask features along one or both dimensions of the mask, e.g., along the columns and/or along the rows, are arranged in a periodic pattern. As discussed in connection with claim 4, the periodic pattern involves features that have about equal length with about equal distance between apertures. Each column of mask 1000 includes four features having about the same length and about the same distance between apertures. Mask 1100 shown in FIG. 11 is a two-dimensional, non-periodic mask. In non-periodic masks, either the length of the features or the spacing between the features, or both, varies along at least one dimension of the mask. Mask 1100 illustrates a type of non-periodic mask having features arranged along the columns in a pseudorandom arrangement.

As illustrated by mask 1200 of FIG. 12, masks need not be rectangular and may be made in any convenient geometric shape. Furthermore, the number of optical features in the columns (or rows) of the mask may or may not be equal. For example, mask 1200 can be considered as having 6 columns along dashed lines 1201-1206. Columns 1201, 1202, 1205, 1206 have two features each, whereas columns 1203 and 1204 each have six features. Masks may include both periodic and non-periodic columns. For example, in mask 1200, columns 1201, 1202, 1203, 1205, 1206 have non-periodically arranged features such as features 1231, 1232, 1213, 1235, 1236 and thus can be considered non-periodic columns. Column 1204 includes periodically arranged features, e.g., feature 1214, and thus can be considered a periodic column. Alternatively, mask 1200 may be considered as having two columns along dashed lines 1203 and 1204 and two rows along dashed lines 1230 and 1240. The columns and rows may be associated with intersecting lanes in a traffic intersection. Multi-dimensional masks may be used to detect objects that move from lane to lane. For example, the objects may move from one lane to another parallel lane. As another example, the objects may move from a first lane to a second lane that at an angle to the first lane.

Figure 13:
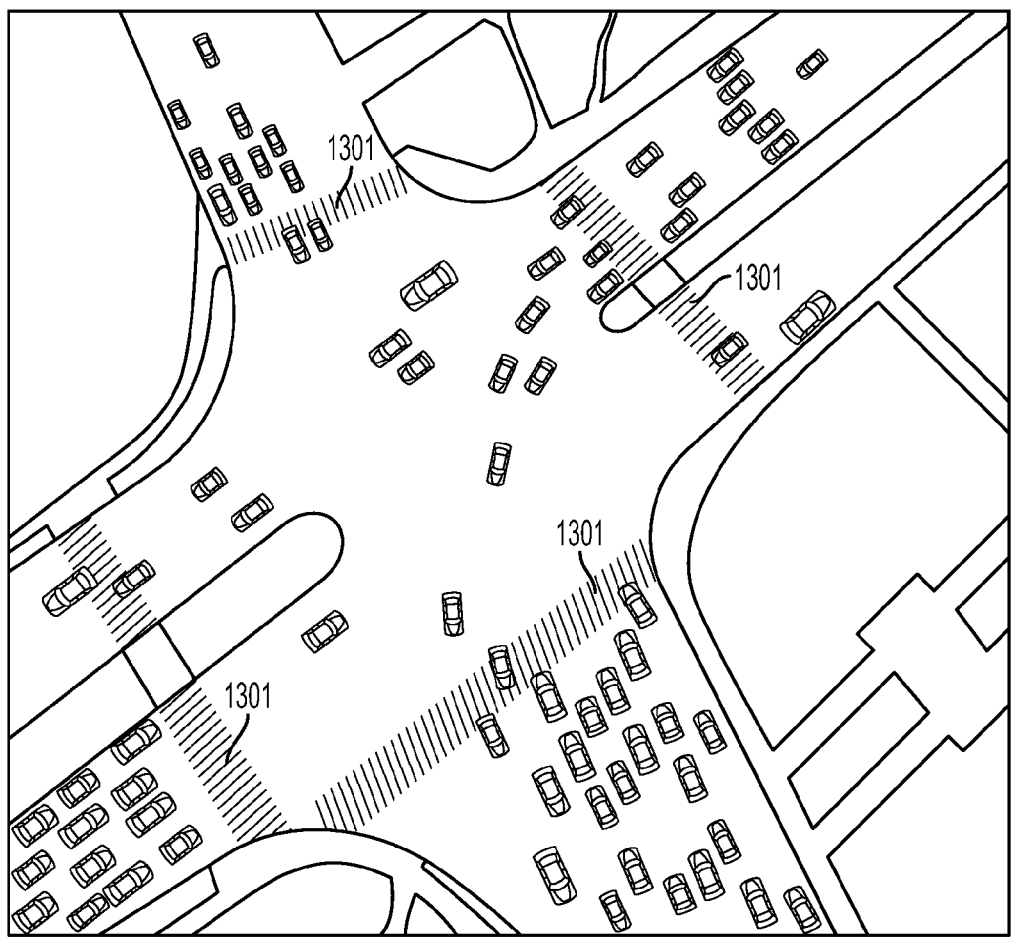

In some configurations, as illustrated in the block diagram of FIG. 5, the mask is disposed between the radiation focusing element and the non-imaging radiation detector. This arrangement is particularly useful for masks that include opaque regions along with transparent features. However, the mask need not be disposed between the focusing optics and the non-imaging radiation detector. For example, the mask may be disposed on the roadway section or intersection itself, as illustrated in FIG. 13. FIG. 13 shows the image of an intersection that includes four pedestrian crosswalks 1301 that form a mask. Objects, e.g. vehicles and pedestrians move in a traffic pattern in the intersection. The crosswalks 1301 comprise white paint on dark pavement. Radiation emanating from objects (in this case, pedestrians) moving in the intersection is affected by the more reflective white paint and the less reflective dark pavement of the mask. The radiation emanating from the objects and affected by the mask is focused onto the non-imaging radiation detector (not shown in FIG. 13). In the same manner also special IR reflecting stripes (not recognizable by humans in the visible spectral range) could be painted on the street in order to create a time modulated signal if traffic objects are passing by. Note that in these cases the mask is already present on the street, therefore no mask in front of the detector is required to create the object stimulated time modulated signal.

In some embodiments, the traffic monitor may use a radiation source that provides a spatially patterned illumination of the traffic objects (on the roadway or intersection) in the observation window. This type of radiation source is referred to herein as a "spatially patterned radiation source." For example, in some configurations, multiple radiation sources can be used to provide a spatial radiation pattern that illuminates the traffic objects. In some configurations, the patterned radiation source comprises a single radiation source used in conjunction with a patterning element that patterns the radiation emanating from the radiation source. For example, the patterning element may include one or more lenses that focuses the radiation to form a spatial pattern of more intense radiation and less intense radiation directed towards the roadway section or intersection being monitored. In these embodiments, a mask disposed between the radiation emanating from the traffic objects and the non-imaging detector is not required. In this implementation, a time modulated signal is created by the non-imaging detector in response to the patterned illumination reflected by the moving traffic objects.

Figure 14:
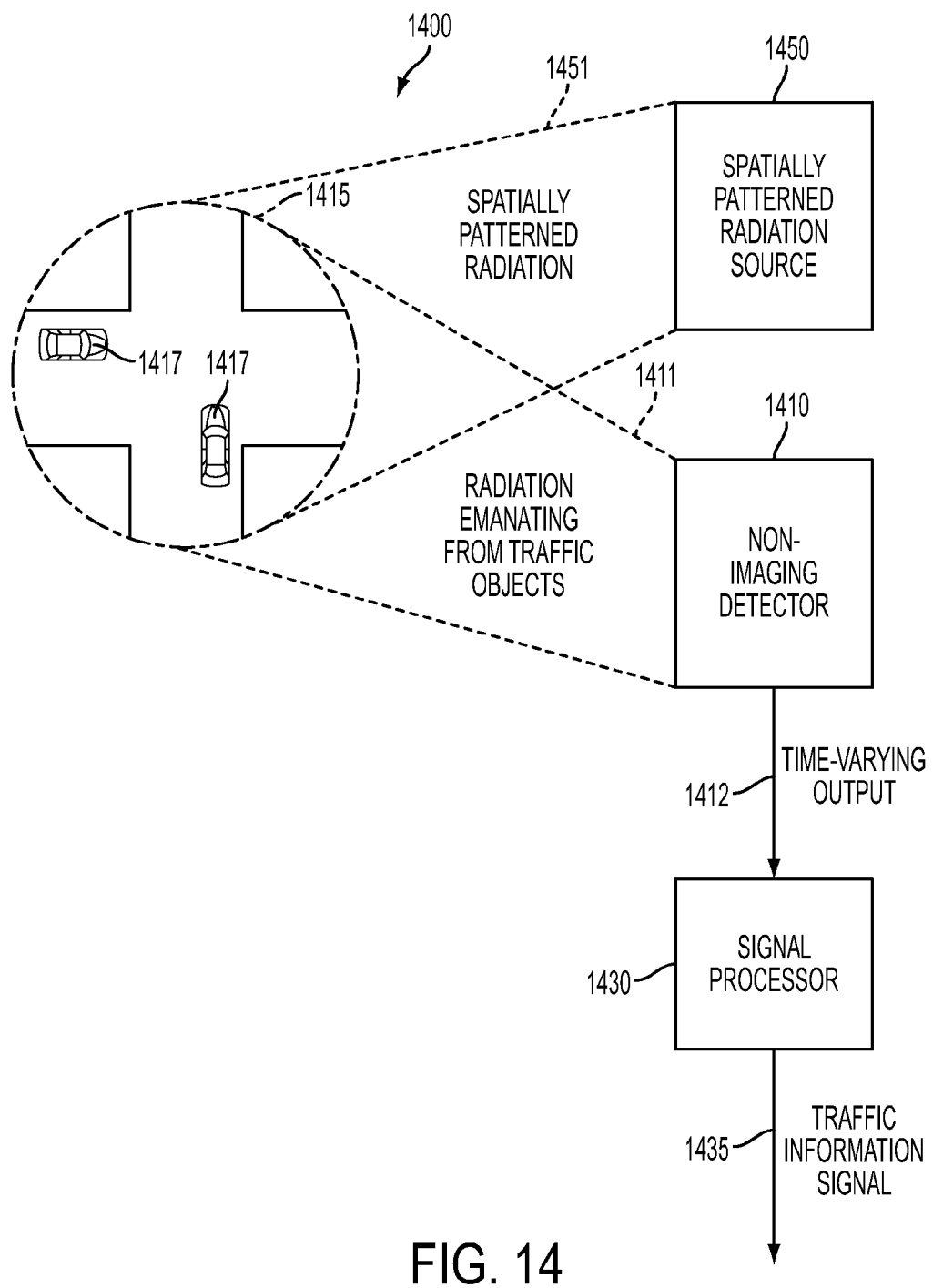
FIG. 14 is a diagram showing a traffic monitor that includes a spatially patterned radiation source according to some embodiments.

FIG. 14 illustrates a non-imaging traffic monitor 1400 according to some embodiments. The non-imaging traffic monitor 1400 includes a spatially patterned radiation source 1450 that directs spatially patterned radiation 1451 toward a roadway or intersection 1415. The spatially patterned radiation 1451 interacts with moving objects 1417 traveling in a traffic pattern in the roadway or intersection 1415. For example, the spatially patterned radiation 1451 may be reflected, refracted, or scattered by the moving objects 1417. The radiation 1411 emanating from the moving objects 1417 includes the patterned characteristic of the source radiation 1451 and provides time varying information about the moving traffic objects 1417. The use of patterned radiation from a radiation source can provide time varying information similar to the time varying information provided by implementations that use a non-patterned radiation source in conjunction with a mask to pattern the radiation emanating from the moving objects as previously discussed. Spatially patterned radiation 1411 emanates from the moving objects 1417 and is sensed by a non-imaging radiation detector 1410.

The radiation source 1450 may emit radiation in the visible and/or non-visible range. When a patterned radiation source is used, the use of radiation in the non-visible range may be particularly useful to reduce or avoid visible patterns that could be distracting to motorists. The spatially patterned radiation 1451 may be patterned in various ways, such as in periodic, pseudo-random, one dimensional, and/or multi-dimensional arrangements. In response to the radiation 1411 emanating from the traffic objects, the non-imaging radiation detector 1410 generates a time varying electrical output signal 1412 that contains information about the traffic objects 1417 in the traffic pattern of the roadway section or intersection 1415.

The time varying output signal 1412 can be analyzed by a signal processor 1430, such as by employing time domain and/or frequency domain analysis techniques. Based on the analysis, the signal processor 1430 generates a signal 1435 that includes traffic information.

Figure 15:
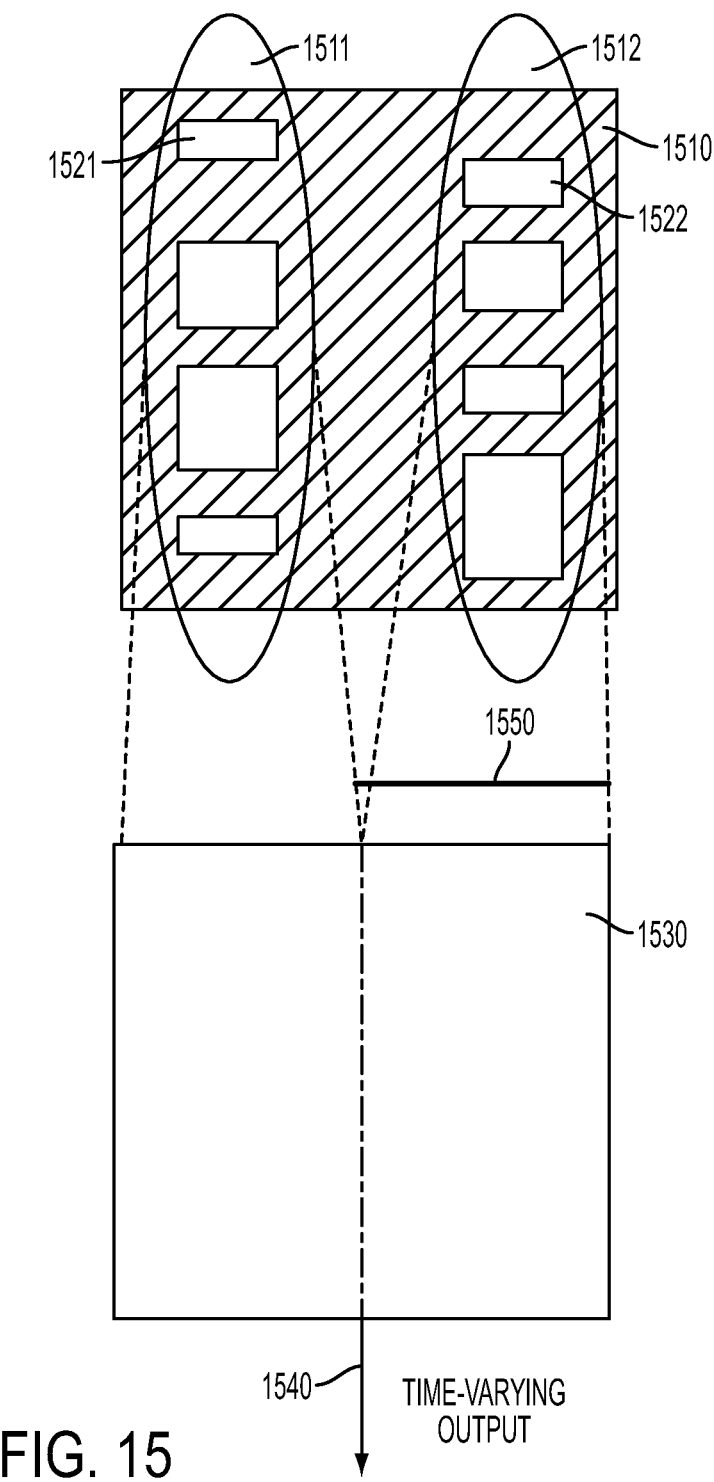
FIGS. 15-17 show various combinations of masks and optical sensors that may be used in a non-imaging radiation detector according to various embodiments.
Figure 16:
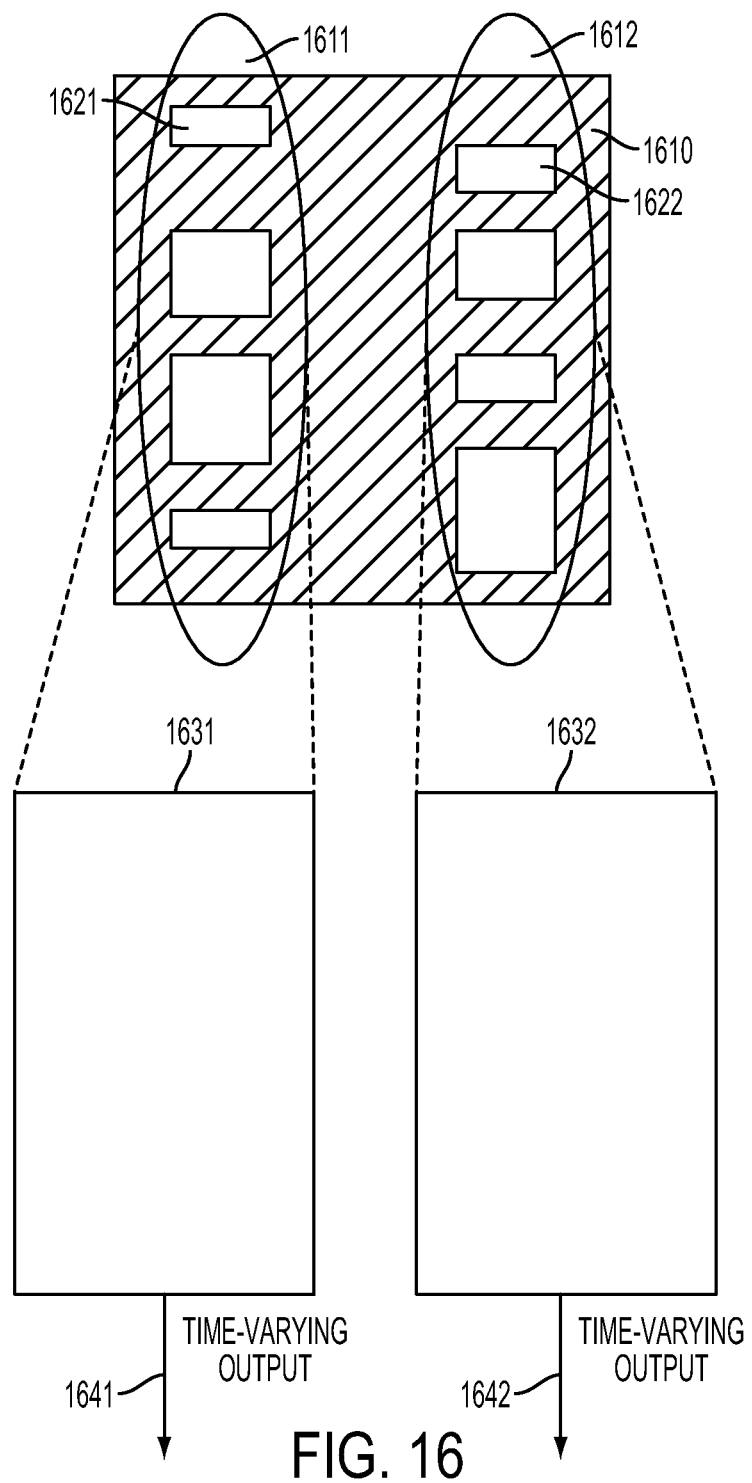
Figure 17:
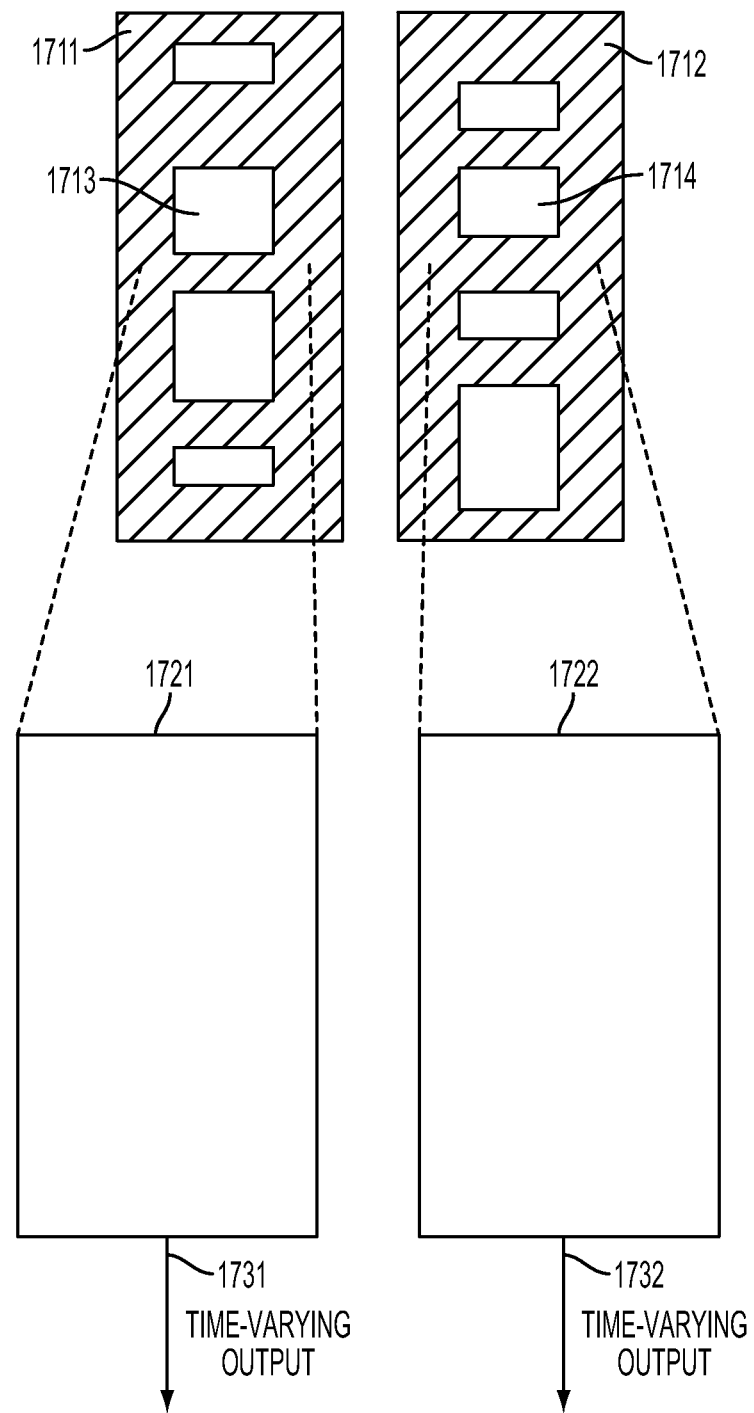

A non-imaging traffic monitor may include various combinations of masks or spatial radiation patterns and optical sensors. FIGS. 15-17 illustrate a few such combinations of masks and optical sensors although various other combinations are also contemplated. It will be appreciated that similar results could be achieved using combinations of spatial radiation patterns and optical sensors.

FIG. 15 shows a configuration that includes only one mask 1510 and only one optical sensor 1520, e.g., a single pixel sensor that produces one time varying output 1530. Mask 1510 includes a first region 1511 comprising a first set of features 1521 and a second region 1512 comprising a second set of features 1522, wherein each set 1521, 1522 of features is arranged as a column of the mask 1510. Each region of the mask 1511, 1512 may be associated with a particular lane of traffic. For example, a first region 1511 of the mask 1510 affects radiation emanating from traffic objects moving within a first lane and a second region 1512 of the mask 1510 affects radiation emanating from traffic objects moving in a second lane. When the radiation associated with both regions 1511, 1512 is incident on the sensor 1530, the time varying output 1540 corresponds to radiation from both regions, i.e., both traffic lanes.

In some configurations, the non-imaging traffic monitor may include an optional shutter 1550, e.g. a mechanical or electronic shutter that can be controlled to block some of the radiation from reaching the sensor 1520. For example, the shutter 1550 can be controlled to block the radiation associated with one set 1521, 1522 of features, while allowing the radiation associated with the other set 1522, 1521 of features to reach the sensor 1530. In this way, when the radiation from one set of features is blocked, the time varying output 1540 corresponds to the radiation from the unblocked set of features, e.g., one traffic lane.

In some cases, the non-imaging traffic monitor uses one mask with multiple radiation sensors. FIG. 16 depicts a configuration that includes one mask 1610 similar to the mask previously discussed in connection with FIG. 15, and two sensors 1631, 1632, each producing a time varying output 1641, 1642. Mask 1610 includes a first region 1611 comprising a first set of features 1621 and a second region 1612 comprising a second set of features 1622. Each set 1621, 1622 of features is arranged as a column of the mask 1610. Each region 1611, 1612 may be associated with a single lane of traffic, for example. Radiation emanating from objects moving in a first traffic lane is affected by the first region 1611 of the mask 1310 and radiation emanating from a second traffic lane is affected by the second region 1612 of the mask 1610. Radiation affected by the first region 1611 is incident on the radiation sensor 1631 and produces time varying output 1641. Radiation affected by the second region 1612 incident on the radiation sensor 1632 produces time varying output 1642.

The non-imaging traffic monitor may use multiple masks and multiple radiation sensors. FIG. 17 depicts a configuration that includes two masks 1711, 1712 and two radiation sensors 1721, 1722. The sensors 1721, 1722 produce time varying outputs 1731, 1732, respectively, based on radiation incident on the sensors 1721, 1722. In this example, masks 1711, 1712, each include one column of features 1713, 1714, although more or fewer feature sets could be included in the masks. In some configurations, the first mask 1711 is associated with a first lane of traffic and the second mask 1712 is associated with a second lane of traffic. Radiation affected by the first mask 1711 (e.g., radiation from a first traffic lane) incident on the radiation sensor 1721 produces time varying output 1731. Radiation affected by the second mask 1712 (e.g., radiation from a second traffic lane) incident on the radiation sensor 1722 produces time varying output 1732.

Figure 18:
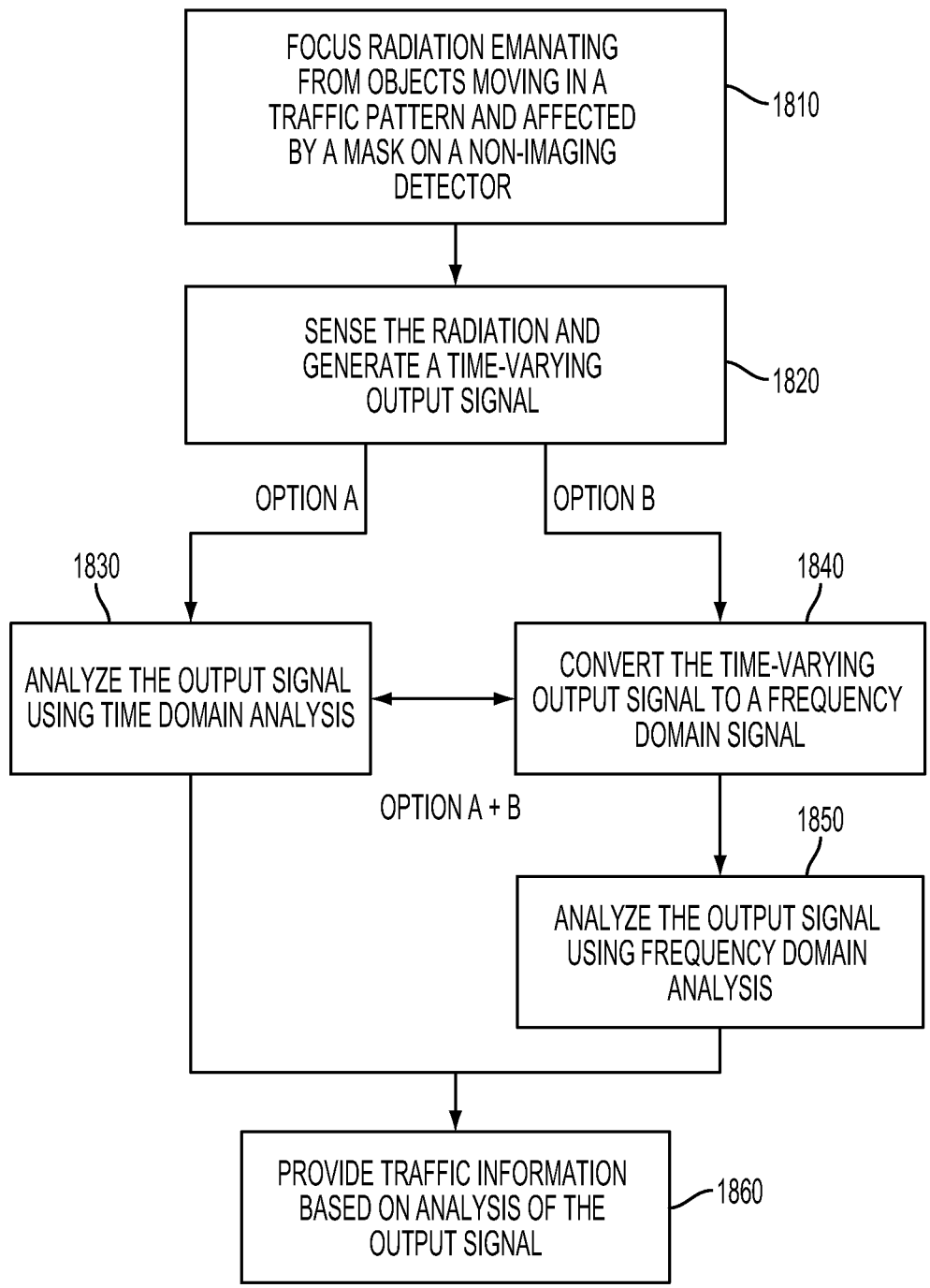
FIG. 18 is a flow diagram illustrating a process of providing traffic information using a non-imaging traffic monitor.

The time varying output from the radiation sensor (or outputs of multiple radiation sensors in the configurations that use multiple sensors) can be analyzed by a signal processor to extract information about the moving objects. FIG. 18 is a flow diagram illustrating a process of providing traffic information using a non-imaging traffic monitor. Time varying radiation emanating from objects moving in a traffic pattern is present 1810 on a non-imaging radiation detector. The non-imaging radiation detector senses 1820 the time varying radiation and outputs a time varying signal corresponding to the radiation. In some configurations, analysis 1830 of the time varying output may optionally include time domain analysis, as indicated by the flow path indicated as OPTION A. In some cases, the time varying signal obtained directly from the sensor is analyzed. In other cases, one or more pre-conditioning processes may be applied to the time varying signal. For example, the signal may be electronically amplified, filtered, e.g., using a digital or analog filter, and/or digitized. In some cases, a derivative of the time varying signal may be determined and the derivative signal is analyzed to extract the traffic information.

The analysis of the time varying output signal may optionally include converting 1840 the time varying output signal to a frequency domain signal, e.g., using a fast Fourier transform (FFT) technique, and analyzing 1850 the frequency domain signal using frequency domain analysis, as indicated by the flow path indicated as OPTION B. For example, performing the FFT of the time varying signal could be used to directly yield the object speed.

In some configurations, the time varying output from the sensor may be analyzed using both time domain and frequency domain (OPTION A+OPTION B). The analysis of the time varying signal provides 1860 information about the moving objects of the traffic pattern. If both time domain and frequency domain analysis are used, the time domain analysis may provide some portions of the traffic information, e.g., type of vehicles and/or density of traffic, and the frequency domain analysis may provide other portions, e.g., vehicle speed.

Figure 19:
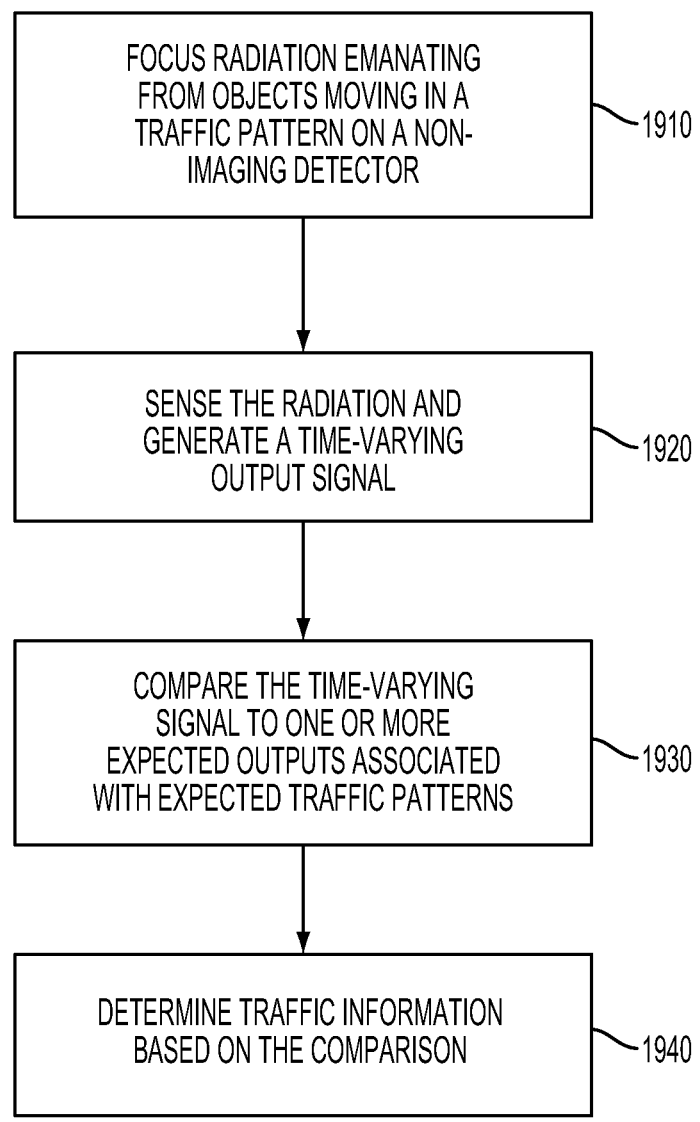
FIGS. 19 and 20 are flow diagrams that illustrate processes for analyzing the time varying output signal of a radiation detector using time domain analysis to provide information about the moving objects in the traffic pattern.

FIG. 19 is a flow diagram that illustrates a process of analyzing the time varying output signal of a radiation detector using time domain analysis to provide information about the moving objects in the traffic pattern. Radiation which emanates from moving traffic objects is incident 1910 onto a non-imaging radiation detector. The non-imaging radiation detector senses 1920 the incident radiation and generates a time varying output signal. The time varying output signal is compared 1930 to one or more expected outputs. The one or more expected outputs are characteristic of various traffic patterns of moving traffic objects. Traffic information is determined 1940 based on the comparison of the time varying output signal to the expected outputs.

For example, using the same mask or radiation pattern, differently sized objects will lead to slightly different time varying signals. Correlating a measured signal with different expected signals (e.g., one expected signal for a large object and a different expected signal for a small object) can be used to reveal size information about the moving object. As another example, traffic objects may change their speed within the observation window of the roadway section or intersection. Comparison of the measured signal to expected signals associated with various speed changes can be used to extract the actual speed changes of the objects moving through the observation window. In a similar way, other traffic information related to the moving object can be obtained such as object direction, lane changes, etc.

Figure 20:
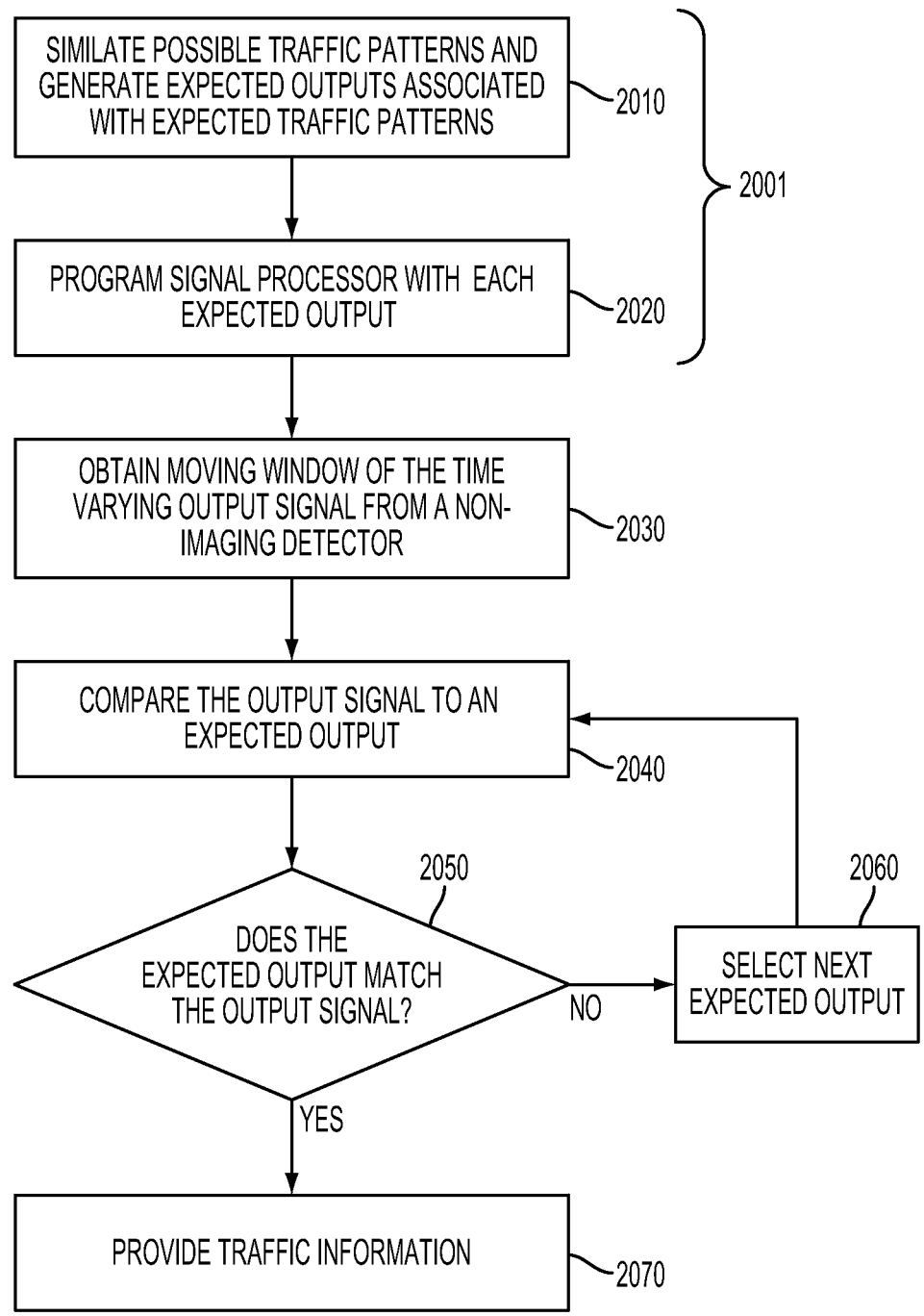

FIG. 20 is a flow diagram that illustrates a process of analyzing the time varying output signal using time domain analysis to obtain traffic information. In an initialization subprocess 2001, a number of possible traffic patterns are simulated 2010, e.g., using a remote computer, and the time varying output signals associated with the simulated traffic patterns are determined. After the expected outputs are determined, the signal processor of the non-imaging traffic monitor is programmed 2020 with each of the expected outputs.

In an operation mode, the non-imaging traffic monitor obtains 2030 a moving time window of the time varying output signal. The output signal in the moving time window is compared 2040 to a selected expected output. If the expected output matches 2050 (e.g., is sufficiently correlated to) the time-varying output signal in the moving window, then the traffic pattern of the roadway section or intersection is consistent with the traffic pattern associated with the expected output. This traffic pattern information is provided 2070 as an output of the non-imaging traffic monitor. However, if the selected expected output does not match 2050 the time varying signal in the moving window, then the next expected output programmed into the signal processor is selected 2060. The loop 2040-2060 continues until a match occurs or until there are no more expected outputs to compare.

Comparing the output signal to the expected output can involve cross-correlation, which is a technique used to measure the similarity between two signals. A time lag is applied to one of the signals and the cross correlation technique can involve "sliding" the time lagged signal over the signal it is being compared to until a match is reached. For continuous functions, f and g, the cross correlation is:

$$(f*g)(t) = \int_{-\infty}^{\infty} f^*(\tau) g(t+\tau) d\tau,$$

where $f^*$ is the complex conjugate of $f$.

In many implementations, it is more convenient for the signal processor to operate on digitized time-varying output signals and expected outputs. For discrete signals, the cross correlation is:

$$(f*g)(n) = \sum_{-\infty}^{\infty} f^*(m) g(n+m).$$

A match between the time-varying output signal and the expected output may be identified when a cross correlation function $((f*g)(t)$ or $(f*g)(n))$ is above a predetermined correlation threshold, for example. Various other techniques may be alternatively or additionally used to extract the traffic information from the time varying output signal. For example, techniques such as blind source separation, independent component analysis (ICA) and/or maximizing mutual information may optionally be used.

The process illustrated in FIG. 20 includes obtaining the expected outputs by simulation of expected traffic patterns. Additionally or alternatively, the expected outputs may be learned by the monitor. For example, during the initialization process, the non-imaging traffic monitor may be positioned in its intended location and may be temporarily operated in conjunction with an additional traffic pattern analysis system. For example, the additional traffic pattern analysis system may be of a more complicated and/or expensive type such as a digital camera coupled to a processor running image processing software that is known a priori to correctly identify traffic patterns. In this configuration, the additional traffic pattern analysis system may be thought of as the "teacher" system and the non-imaging traffic monitor may be thought of as the "student" system. As the teacher system identifies certain traffic patterns, e.g., vehicles present in certain lanes, etc., this information is provided to the student system where the identified traffic pattern is associated with the time varying output signal at the time the identified traffic pattern occurred. Association of the known traffic patterns with the time varying output signals over a period of time produces many expected outputs that are associated with expected traffic patterns. The expected outputs are stored in the non-imaging traffic monitor for later use. During a preliminary operation, both the teacher system and the student system may be operational, both providing traffic information that is based on identification of the traffic patterns. The teacher system may compare its output with that of the student system to determine the proficiency of the student system and may provide feedback in case of erroneous identification. When a desired level of proficiency is reached by the student system, the teacher system may be removed or moved to another location to train a different non-imaging traffic monitor.

The radiation sensor used for the non-imaging traffic monitor may be of various types and sensitive to various radiation frequencies. In some implementations, the moving objects are illuminated by ambient light, e.g., the sun and/or other ambient light sources such as streetlights. In order to increase the sensitivity of the monitor, one or more additional radiation sources may be used, such as a pulsed radiation source. Active illumination can be especially important if a detection wavelength outside the visible wavelength spectrum is desired.

Figure 21:
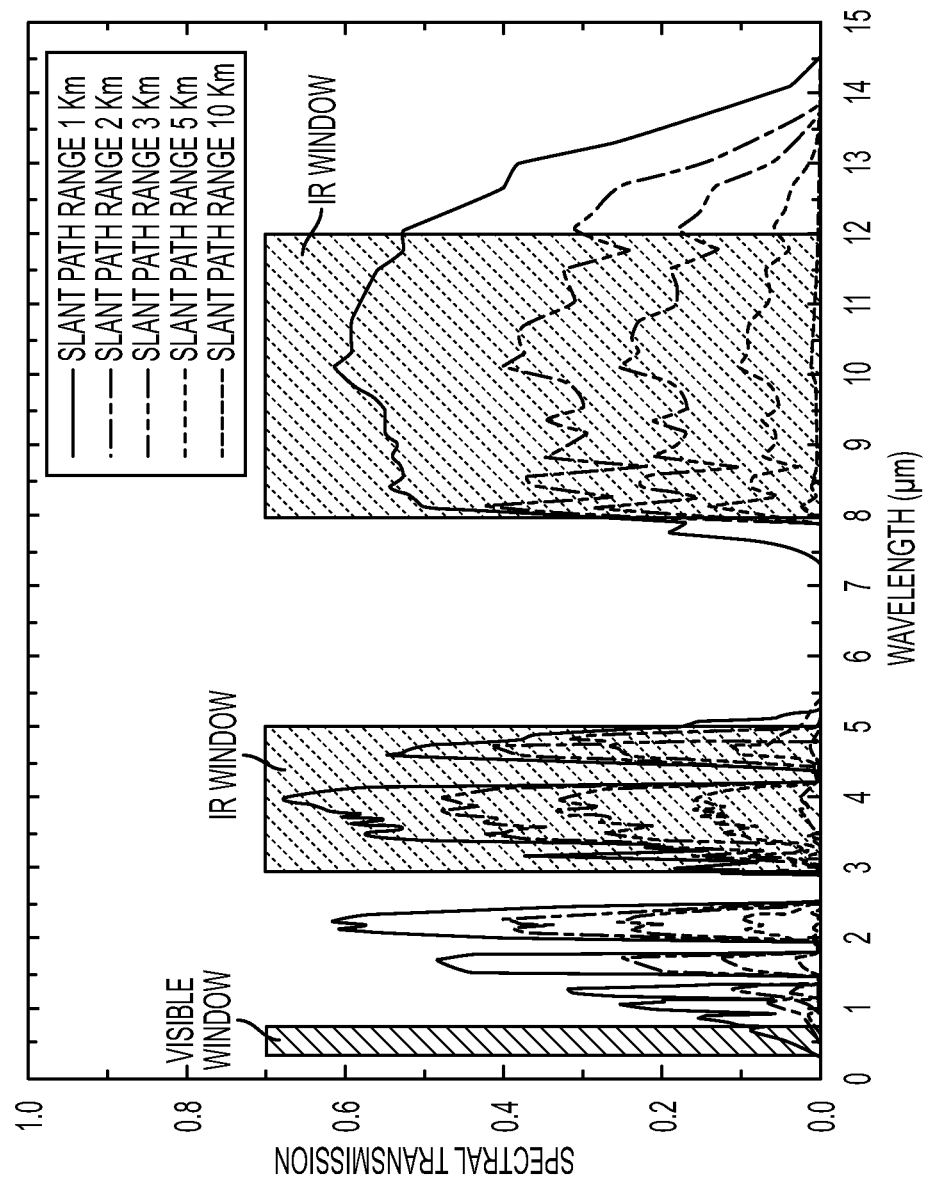
FIG. 21 shows the spectral transmission for the visible band and two IR windows.
Figure 22:
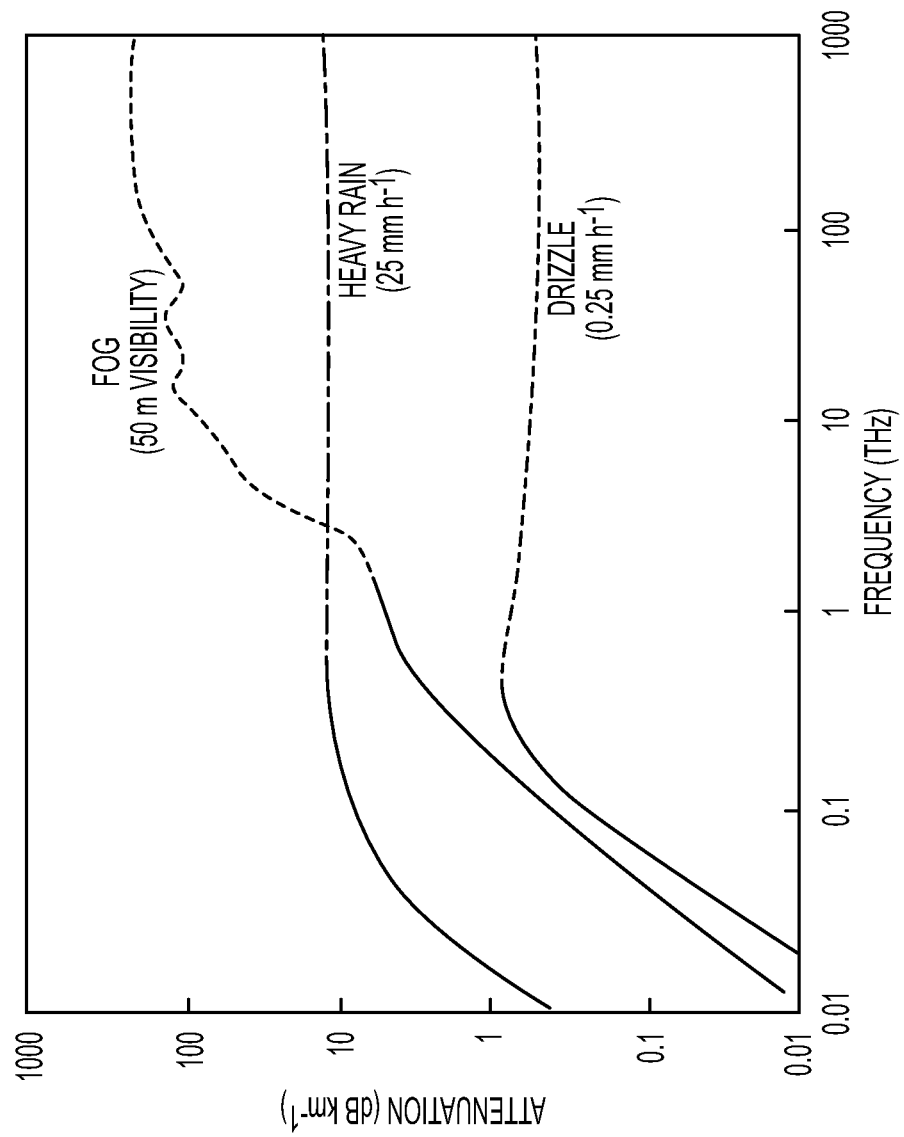
FIG. 22 shows the attenuation by fog, heavy rain, and drizzle for radiation frequencies from 0.01 to 1000 terahertz.

Silicon radiation sensors sensitive in the 380 nm to 1100 nm wavelength band may generate outputs that are significantly attenuated under bad weather conditions (e.g., fog, rain, drizzle). The 380 nm to 1100 nm band is more affected by absorption by water particles during these bad weather conditions when compared to other wavelength bands, e.g., infrared (IR) and the terahertz range, as indicated by FIGS. 21 and 22. Thus, some IR and terahertz bands may be attractive candidates for traffic monitoring. Cameras outside of the spectral range covered by silicon radiation sensors (380 nm-1100 nm) are very expensive, which may limit the economic feasibility of traffic monitors that rely on imaging detectors outside the visible range. Thus, the concept of using a non-imaging radiation detector in combination with a spatial mask or spatial patterning of the environment (spatially patterned radiation or stripes on the road) may be particularly attractive as this technique can be used to provide a cost effective approach to traffic monitoring using radiation outside the visible range.

FIG. 21 shows the spectral transmission for the visible band of about 500 nm to about 800 nm, and two IR windows, the first IR window from about 3000 to about 5000 nm and the second IR window being from about 8000 nm to about 12000 nm. Both the 3000 to about 5000 nm band and the 8000 nm to about 12000 nm band show superior transmission characteristics for slant path ranges from 1 km to 10 km.

FIG. 22 shows the attenuation by fog, heavy rain, and drizzle at radiation frequencies from 0.01 to 1000 terahertz (THz), which corresponds to a wavelengths range from 30 mm to 300 nm. The attenuation due to these bad weather conditions in the THz frequency range can be less than the attenuation in the IR or visible bands. Thus, the radiation transmission characteristics of either the terahertz and/or IR frequencies may provide greater signal to noise ratio when compared to the visible band, particularly under bad weather conditions. In some implementations, a combination of detectors covering different wavelength bands could be used to detect moving objects in a variety of conditions, e.g., weather and light conditions, e.g. day and night.

Systems, devices or methods disclosed herein may include one or more of the features, structures, methods, or combinations thereof described herein. For example, a device or method may be implemented to include one or more of the features and/or processes described below. It is intended that such device or method need not include all of the features and/or processes described herein, but may be implemented to include selected features and/or processes that provide useful structures and/or functionality. The description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A traffic monitor, comprising:
 a non-imaging, single radiation detector;
 a mask comprising a non-periodic arrangement of mask features including multiple radiation-transparent mask features; and
 a focusing element configured to focus radiation emanating from objects moving in a traffic pattern and affected by each of the multiple radiation-transparent mask features onto the non-imaging, single pixel radiation detector, wherein the non-imaging, single pixel radiation detector is configured to sense the radiation and to generate a time varying output signal based on sensed radiation.

2. The monitor of claim 1, wherein the non-periodic arrangement of mask features comprises pseudo randomly arranged mask features.

3. The monitor of claim 1, wherein the non-periodic arrangement of mask features comprises a one dimensional array of mask features.

4. The monitor of claim 1, wherein the non-periodic arrangement of mask features comprises a multi-dimensional array of mask features.

5. The monitor of claim 4, wherein the focusing optics are configured to
 focus radiation emanating from first objects moving in a first traffic lane and affected by a first region of the mask comprising a first set of mask features on the single pixel non-imaging radiation detector and
 focus radiation emanating from second objects moving in a second traffic lane and affected by a second region of the mask comprising a second set of mask features on the single pixel non-imaging radiation detector.

6. The monitor of claim 1, further comprising signal processing circuitry configured to analyze the time varying output signal and to provide information about the traffic pattern based on analysis of the time varying output signal.

7. The monitor of claim 6, wherein the signal processing circuitry is configured to analyze the time varying output signal by comparing the time varying output signal to one or more expected outputs.

8. The monitor of claim 6, wherein the signal processing circuitry is configured to convert the time varying output signal to a frequency domain signal and to analyze the frequency domain signal.

9. The monitor of claim 1, wherein wavelengths of the radiation are in a range of about 30 mm to about 300 nm.

10. The monitor of claim 1, further comprising a radiation source configured to provide at least some the radiation that emanates from the moving objects.

11. The monitor of claim 1, wherein the traffic information comprises one or both of vehicle and pedestrian traffic information.

12. The monitor of claim 1, wherein the traffic information comprises one or more of vehicular speed, direction, type, size, acceleration, color, direction, lane, and lane change information.

13. A traffic monitor, comprising:
 a non-imaging, single radiation detector;
 a mask comprising arrangement of mask features including multiple radiation-transparent mask features;
 a focusing element configured to focus radiation emanating from objects moving in a traffic pattern and affected by each of the multiple radiation-transparent mask features onto the single pixel non-imaging radiation detector, the non-imaging, single radiation detector configured to sense the radiation and to generate a time varying output signal based on sensed radiation; and
 signal processing circuitry configured to analyze the time varying output signal by time domain analysis to provide traffic information.

14. The traffic monitor of claim 13, wherein the signal processing circuitry is configured to analyze the time varying output signal by comparing the time varying output to one or more expected outputs.

15. The traffic monitor of claim 14, wherein comparing the time varying output to one or more expected outputs comprises calculating a correlation between the time varying output signal and the one or more expected outputs.

16. The traffic monitor of claim 13, wherein the signal processing circuitry is configured to analyze the time varying output signal by determining a derivative of the time varying output signal.

17. A traffic monitor, comprising:
 a non-imaging, single pixel radiation detector;
 a mask comprising a multi-dimensional array of multiple radiation-transparent mask features; and
 a focusing element configured to focus radiation emanating from objects moving in a traffic pattern and affected by each of the multiple radiation-transparent mask features onto the non-imaging single pixel radiation detector, wherein the non-imaging, single pixel radiation detector is configured to sense the radiation and to generate a time varying output signal based on sensed radiation.

18. The monitor of claim 17, wherein the multi-dimensional array of mask features comprises mask features arranged in a periodic pattern.

19. A method of monitoring traffic, comprising:
 sensing spatially patterned radiation emanating from a traffic object moving in a traffic pattern using a non-imaging, single pixel detector;
 generating a time varying output signal based on the spatially patterned radiation;
 analyzing the time-varying output signal using time domain analysis; and
 providing traffic information based on the time domain analysis of the time-varying output signal, wherein the spatially patterned radiation includes multiple higher intensity regions and multiple lower intensity regions.

20. The method of claim 19, further comprising:
 producing the spatially patterned radiation by generating the patterned radiation using a patterned radiation source;
 directing the spatially patterned radiation toward the traffic objects, wherein the spatially patterned radiation emanating from traffic objects comprises the spatially patterned radiation which is reflected by the traffic objects.

21. The method of claim 19, further comprising producing the spatially patterned radiation by interacting radiation emanating from the traffic objects with a mask.

22. A traffic monitor, comprising:
 a radiation source configured to emit spatially patterned radiation including multiple higher intensity regions and multiple lower intensity regions toward moving traffic objects, the spatially patterned radiation being reflected by the moving traffic objects;

a non-imaging, single pixel radiation detector configured to sense the spatially patterned radiation which is reflected by the moving traffic objects and to generate a time varying output signal based on the reflected radiation; and signal processing circuitry configured to analyze the time varying output signal to provide traffic information.

23. A traffic monitor, comprising:

a non-imaging, single pixel radiation detector configured to sense spatially patterned radiation emanating from an object moving in a traffic pattern and to generate a time varying output signal based on the sensed radiation; and signal processing circuitry configured to analyze the time varying output signal using time domain analysis to provide traffic information, wherein the spatially patterned radiation includes multiple higher intensity regions and multiple lower intensity regions.

24. The traffic monitor of claim 23, further comprising at least one of:

a radiation source configured to produce the spatially patterned radiation;

a mask configured to interact with radiation emanating from the moving objects to produce the spatially patterned radiation; and a pattern disposed on a roadway section or intersection.

* * * * *